United States Patent [19]
Tani

[11] Patent Number: 6,089,271
[45] Date of Patent: Jul. 18, 2000

[54] GAS RELIEF VALVE FOR A CONTAINER

[76] Inventor: Kanari Tani, 70, Minamigaoka 4-chome, Ohnojo-shi, Fukuoka, Japan

[21] Appl. No.: 08/783,490

[22] Filed: Jan. 14, 1997

[30] Foreign Application Priority Data

Jan. 16, 1996 [JP] Japan .................................. 8-005265

[51] Int. Cl.⁷ .............................. F16K 15/14; B65D 33/01
[52] U.S. Cl. .......................... 137/854; 383/103; 137/859
[58] Field of Search ..................... 137/854, 859, 137/246; 383/100, 103

[56] References Cited

U.S. PATENT DOCUMENTS

| | | | |
|---|---|---|---|
| 3,799,427 | 3/1974 | Goglio | 137/854 |
| 4,020,828 | 5/1977 | Steed | 137/859 |
| 4,356,012 | 10/1982 | Hofstetter | 383/103 |
| 4,365,715 | 12/1982 | Egli | 383/103 |
| 4,444,219 | 4/1984 | Hollenstein | 137/246 |
| 4,690,667 | 9/1987 | Domke | 383/103 |
| 4,726,149 | 2/1988 | Pickl, Jr. | 137/859 |
| 5,093,047 | 3/1992 | Zeppenfeld | 137/859 |
| 5,246,031 | 9/1993 | Eichler et al. | 137/859 |
| 5,320,253 | 6/1994 | Robinson | 137/854 |
| 5,325,885 | 7/1994 | Ivan et al. | 137/854 |
| 5,332,095 | 7/1994 | Wu | 137/859 |
| 5,348,179 | 9/1994 | Walker | 137/859 |
| 5,354,133 | 10/1994 | Rapparini | 137/246 |
| 5,388,615 | 2/1995 | Edlund et al. | 137/859 |
| 5,584,409 | 12/1996 | Chemberlen | 383/103 |
| 5,782,266 | 9/1998 | Domke | 383/103 |

FOREIGN PATENT DOCUMENTS 60-31704  7/1985  Japan .

Primary Examiner—Denise L. Ferensic
Assistant Examiner—Joanne Y. Kim
Attorney, Agent, or Firm—Jordan & Hamburg LLP

[57] ABSTRACT

Disclosed is a gas relief valve for a container for storing contents generating gases, having a support member having an aperture through which to discharge gases when they are filled in the container, when the gas relief valve is mounted on the container; an opening or closing member which closes the aperture of the support member in a normal state and which is caused to open by the gases discharged from the aperture when the gases filled in the gas relief valve reaches a predetermined inner gas pressure; and a pressing member disposed outside the opening or closing member so as to cause the opening or closing member to close the aperture of the support member so as to allow air outside the gas relief valve to fail to enter therein after the gases filled in the gas relief valve are discharged therefrom.

18 Claims, 13 Drawing Sheets

GAS RELIEF VALVE FOR A CONTAINER

BACKGROUND OF THE INVENTION

1. Field of the Invention

The present invention relates to a gas relief valve for a container and, more particularly, to a gas relief valve for a container, especially for an airtight closed container with contents generating gases during storage.

2. Description of the Related Art

For example, coffee beans or the like generate carbon gases upon roasting them. An amount of the carbon gases generated from coffee beans or the like become much larger particularly when they are pulverized to powders in a short time after they have been roasted and allowed to cool in a natural state. When powdery coffee beans or the like are packed in a container, such as a bag, box, can or the like, and the container is closed airtight or hermetically, the airtight closed container may become filled with carbon gases generated from the coffee powders or the like packed therein and the gases cause swelling the closed container with the contents such as coffee beans or the like filled therein. If the closed container continues swelling more and more, such continual swelling may eventually lead to a rupture of the closed container.

If containers which are filled with carbon gases generated from coffee powders or the like and which are swollen by the carbon gases filled therein are placed, for example, on counters of shops or the like, consumers may think of the coffee powders or beans contained in such swollen containers as time passing or deteriorating in quality.

Therefore, conventional containers in which to fill with contents such as, for example, coffee beans or powders, are provided with gas relief valves which are disposed, on the one hand, so as to remove carbon gases generated from the contents from the closed containers therethrough toward the outside before the carbon gases generated from contents packed therein and filled therein eventually lead to a rupture of the closed containers and, on the other hand, so as to suppress air from penetrating through the gas relief valve.

Some conventional gas relief valves are of a type having the function of discharging gases generated from contents filled in a closed container from the closed container to the outside while, at the same time, having the function as a check valve capable of suppressing air from penetrating into the container from the outside thereof. Such a gas relief valve comprises a ring shaped base plate made of a plastic material, a circular valve of a thin film made of a synthetic resin and having a shape substantially equal to the shape of the ring-shaped base plate, and a pair of left-hand and right-hand segments each having an arc shape substantially equal to the arc of the circular valve. An aperture of the ring-shaped base plate functions as a gas flow-out passage from the closed container when the gas relief valve is disposed on an outer surface of the container in which to fill with contents. The container is provided at its outer surface with an aperture having a small diameter through which to discharge the gases from the closed container to the outside. The gas relief valve is fused and attached integrally to the inner side wall surface of the container so as to let the aperture of its ring-shaped base plate coincide concentrically with the aperture of the container and the circular film valve is disposed on the ring-shaped base plate. Further, the pair of the left-hand and right-hand arc-shaped segments are fused and attached integrally on the circular film valve in a spatial relationship having a predetermined interval therebetween so as to allow each of the arc portions of the left-hand and right-hand arc-shaped segments to coincide with the corresponding arc portions of the circular film valve and to cause each of the chord portions of the arc-shaped segments to fail to close an upper portion of the aperture of the ring-shaped base plate. The bottom portions of the left-hand and right-hand arc-shaped segments are fused and attached integrally to the upper surface of the ring-shaped base plate so as to fail to close the aperture disposed in the ring-shaped base plate. As described hereinabove, the conventional gas relief valve is configured in such a structure that the opening disposed in the side wall of the container is enclosed concentrically with the aperture disposed in the ring-shaped base plate so as to allow gases filled in the container to pass through the apertures and to be discharged from the closed container, that the arc-shaped segments are disposed on the upper surface of the ring-shaped base plate so as to fail to close the aperture of the ring shaped base plate and so as to allow the spatial interval between the chords of the left-hand and right-hand arc-shaped segments to constitute a passage for the gases discharged through the closed container, and that the circular film valve is disposed on the arc-shaped segment so as to fail to close the gas-flow passage formed between the chords of the left-hand and right-hand arc-shaped segments.

With the arrangement of the structure of the conventional gas relief valve in the manner as described hereinabove, the aperture of the ring-shaped base plate disposed concentrically over the gas-flow opening of the side wall of the container is closed with the circular film valve disposed on the arc-shaped segment in a usual state, thereby causing the gases filled in the closed container to fail to be leak therefrom into the outside and, at the same time, preventing air from penetrating through the apertures of the ring-shaped base plate and the side wall of the container thereinto from the outside. On the other hand, as the gases are filled in the closed container and the gas pressure in the closed container is caused to elevate and reaches a predetermined pressure level, the portion of the circular film valve corresponding to or over the aperture of the ring-shaped base plate is caused to swell upward by the gases forced to pass through the apertures thereof, thereby forming a gas-flow gap between the upper surface of the ring shaped base plate and the bottom surface of the circular film valve and between the chords of the left-hand and right-hand arc-shaped segments, as well as eventually to be opened, thereby allowing the gases filled in the closed container to pass through the apertures of the closed container and the ring-shaped base plate and to be discharged through the gas-flow gap from the closed container to the outside.

As described hereinabove, the arrangement of the conventional gas relief valve can place the circular film valve over the gap portion between the chords of the left-hand and right-hand arc-shaped segments in usual instances in such a close state as capable of suppressing air from entering the closed container from the outside; however, in some cases, the extent of closeness may not be so airtight that the air cannot thoroughly penetrate into the gap between the ring-shaped base plate and the circular film valve because the risk still exists that there may be formed an opening so small yet enough to cause the air to enter the closed container through the opening from the outside of the container. If the air would enter the closed container with contents such as coffee beans, coffee powders or the like filled therein, the oxygen in the air may accelerate deterioration in the quality of the contents.

SUMMARY OF THE INVENTION

As a result of extensive research on improvements in drawbacks of a conventional gas relief valve for a container with contents generating gases, it has been found by the present inventors by devising the structure of a gas relief valve mounted on an inner side wall surface of the container that the gas relief valve can be caused to open to a slight extent and the gases filled in an airtight closed container can be discharged from the closed container when an inner pressure inside the closed container is raised to a predetermined degree of pressure by the gases filled therein, on the one hand, and that the gas relief valve can be caused to close again automatically when the inner pressure in the closed container is reduced to such a predetermined degree of pressure due to a release of the gases filled therein, on the other, thereby preventing the gases from flowing out from the closed container and causing the air from entering it. Accordingly, the present invention has been completed on the basis of this finding.

The present invention has the object to provide a gas relief valve for a container having a high degree of airtightness, which can provide an extremely high degree of airtightness and which is disposed in such a manner that the gas relief valve is so adapted as to automatically open to discharge the gases filled in the closed container when an inner pressure in the closed container reaches a level slightly larger than a predetermined degree of pressure by the gases filled therein, on the one hand, while it is automatically closed again so as for the gases within the closed container to fail to be discharged any longer therefrom and, at the same time, for the air to fail to enter into it from the outside of the container.

It is another object of the present invention to provide a gas relief valve for a container with contents generating gases such as carbon gases or the like, which is adapted, on the one hand, so as to open automatically to allow the gases present in the closed container to be discharged therefrom when the gases generated from the contents of the container and filled therein are increased to a predetermined inner pressure level and at the same time, on the other hand, so as to close automatically to prevent air from entering into the closed container from the outside of the container, when the gases filled therein are discharged from the gas relief valve and the inner pressure level in the closed container is reduced to a level lower than the predetermined inner pressure level.

In order to achieve the objects, the present invention provides the gas relief valve for a container with contents generating gases, which comprises a support means, an opening or closing means and a pressing means. The support means is provided with a through opening through which to allow the gases generated from the contents in an airtight closed container and filled therein to be discharged through an opening disposed in the container when the gas relief valve is mounted on the container. The opening or closing member is mounted on the support means in such a way that it is allowed to automatically open when the gases filled in the closed container are caused to be leaked from the closed container on which the support means in turn is mounted and to automatically close again when the gases filled therein have been discharged therefrom to reduce an inner pressure in the container to a predetermined level. The pressing means is in turn mounted on an upper surface of the opening or closing member so as to allow the opening or closing member to open or close in the manner as described hereinabove yet to cause the opening or closing member to fail to tear off from the support means.

In the gas relief valve for the container according to the present invention, the opening or closing member is preferably made of a flexible material having such a degree of flexibility as elastic enough to easily bend by a predetermined level of pressure created by the gases generated from the contents filled in the container and imposed upon the opening or closing member, yet rigid enough to automatically restore the bent shape to its original position when no pressure is imposed thereonto.

Further, the pressing means likewise is preferably made of a flexible material having such a degree of flexibility as elastic enough to easily bend by a predetermined level of pressure created by the gases generated from the contents filled in the container and imposed upon the opening or closing member, yet rigid enough to automatically restore the bent shape to the original position when no pressure is imposed thereonto.

The gas relief valve for the container according to the present invention may be provided with a single aperture or opening or a plurality of apertures or openings through which to discharge the gases discharged from the contents in the closed container and filled therein with the gas relief valve mounted thereon from the closed container.

For the gas relief valve for the container according to the present invention, a non-drying liquid may be coated on the surface of the support means and/or the surface of the opening or closing member so as to ensure a sufficient intensity of contact.

More specifically, the gas relief valve for a container with contents generating gases in accordance with the present invention comprises a casing as the support means and a valve member as the opening or closing means, wherein the casing is provided with a through opening through which gases filled in an airtight closed container are caused to pass through an opening disposed in the container on which the gas relief valve is mounted and to be discharged therefrom; and wherein the valve member is attached at its bottom side to an outer surface of the casing in a thoroughly airtight state in a usual case, while it is structured such that, when gases are filled in an airtight closed container on which the gas relief valve is mounted and the inner pressure in the container reaches a level higher than a predetermined inner pressure, on the one hand, the gases filled therein force the surface of the valve member in contact with the casing upwards so as to gradually open slightly, thereby eventually forming a gas-flow gap through which the gases filled in the closed container are caused to discharge from the closed container and, when the inner pressure in the container is lowered to the predetermined level as a result of withdrawal of the gases filled therein, the gas-flow gap formed between the valve member and the casing is allowed to automatically close and to restore the valve member to its original status and attach the valve member again to the casing in a highly airtight state. The arrangement of the gas relief valve ensures a secure removal of the gases from the inside of the closed container when the gases generated from the contents in the closed container and filled therein are increased to a level higher than the predetermined inner pressure level, thereby capable of avoiding a rupture of the container as well as suppressing the closed container from being swollen and preventing a value as goods from being lowered due to a look of a swollen container in which contents are packed. Further, as the valve member is so structured as to automatically restore its shape to its original position when the inner gas pressure level within the closed container is reduced to the predetermined level and it automatically attaches again to the casing in a highly airtight way, air, particularly oxygen, can be suppressed from entering the container from outside, thereby capable of preventing the contents in the container from oxidizing and, as a result, deteriorating in quality.

The gas relief valve for the container according to the present invention further comprises a pressing member as the pressing means which in turn is disposed on an upper surface of the valve member. The pressing member acts as pressing the valve member so as to fail to detach from the valve member particularly when the valve member is caused to open by the gases discharged from the closed container through the gas-flow gap formed between the valve member and the casing.

In the gas relief valve for the container according to the present invention, the valve member may be made of a flexible material so that it can be easily bent to form a gas-flow gap in association with the casing and allow the gases to pass toward the outside through the gas-flow gap when the gases are filled in the closed container and the inner gas pressure reaches a predetermined level, while it can be easily bent to restore to its original state, thereby enabling air to be suppressed from entering from the outside into the container.

In the gas relief valve for the container according to the present invention, a non-drying liquid may be coated on the upper surface of the casing and/or the bottom surface of the valve member, thereby ensuring an airtight contact between the casing and the valve member and a hermetic or airtight re-contact of the valve member with the casing when the valve member is restored to its original state.

Other objects, features and advantages of the present invention will become apparent in the course of description which follows, with reference to the accompanying drawings.

DESCRIPTION OF THE PREFERRED EMBODIMENTS

The gas relief valve according to the present invention will be described specifically in more detail by way of examples with reference to the accompanying drawings.

Figure 1:
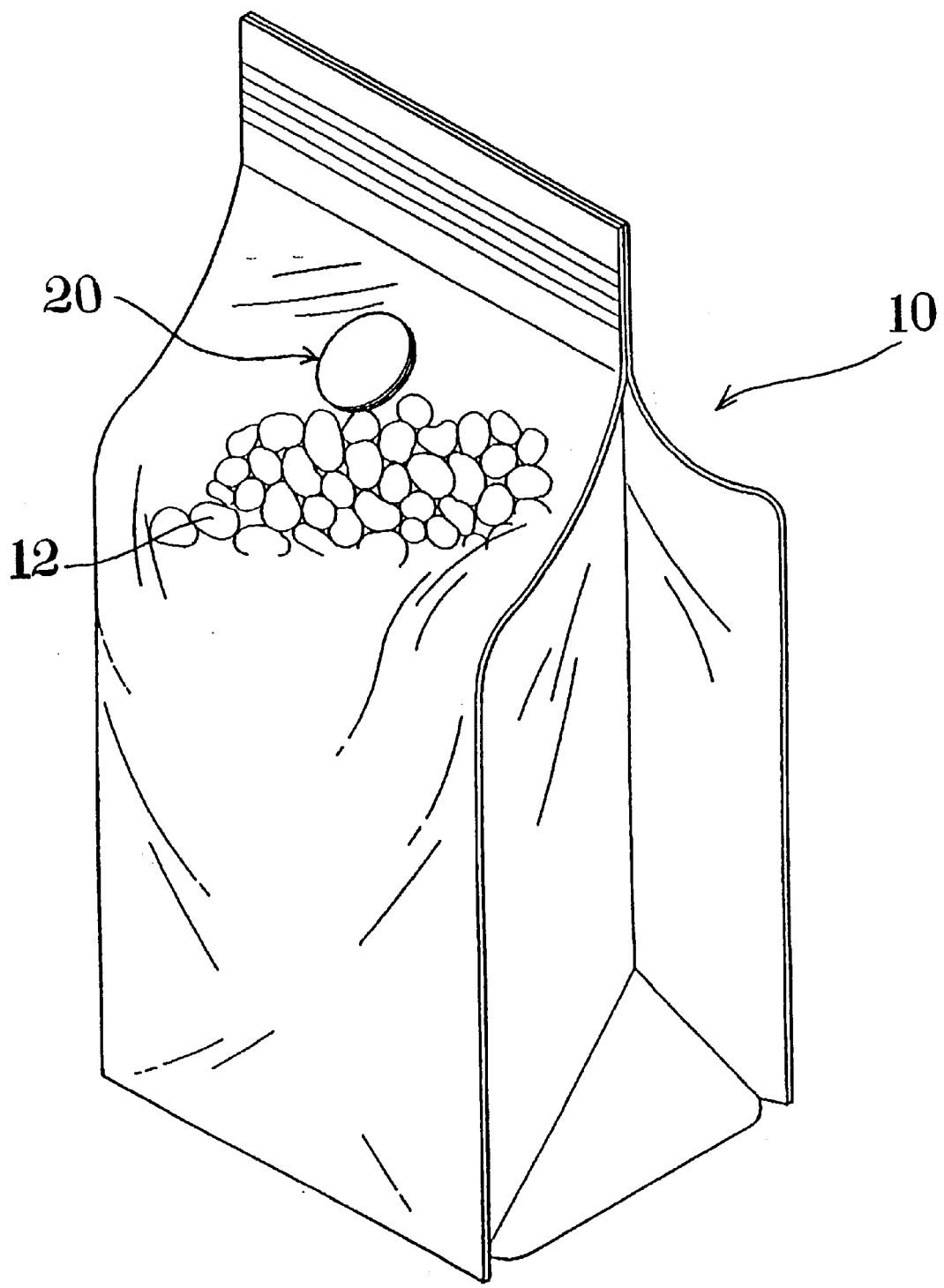
FIG. 1 is a perspective view showing a container on which a gas relief valve according to the present invention is mounted.

FIG. 1 is a perspective view showing an example of the container on which a gas relief valve according to the present invention is to be mounted. In FIG. 1, reference numeral 10 stands for an example of a container on which a gas relief valve for a container according to the present invention is to be mounted and reference numeral 20 stands for a gas relief valve according to the present invention. The container 10 may include, for example, a paper bag, polyethylene bag, laminated film bag made from a laminated film of a synthetic resin such as, for example, polyethylene or polypropylene, a can or the like. In the container 10, contents 12, such as, for example, coffee beans, coffee powders, soy paste or the like, may be packed and the container 10 is sealed airtight. The contents 12 such as, for example, coffee beans, coffee powders, soy paste or the like, generate carbon gases and the gases filled in the airtight closed container 10 may lead to swelling the closed container 10. If the gases would not be discharged and they continue increasing therein, the container 10 is caused to expand and may eventually lead to a rupture. Therefore, in accordance with the present invention, the container 10 is provided with the gas relief valve 20 that is so structured as to enable the gases filled therein to be discharged therefrom while to allow the air to fail to penetrate into the inside of the container 10 from the outside.

A aperture 14 is provided at an upper portion on a side surface of the container 10 so as to allow the gases generated from the contents in the container 10 and filled therein can be discharged therethrough. The aperture 14 may be provided singly or plurally as needed. The aperture 14 may be preferably located at an upper portion of the side wall surface of the container 10 in order for the contents 12 packed in the container 10 to fail to block its opening. If the aperture 14 is left open, air penetrates from the outside into the container 10, thereby avoiding the risk of deteriorating in the quality of the contents 12, although the gases filled in the container 10 can be discharged therethrough. Therefore, in accordance with the present invention, when the container 10 is packed with contents 12 oxidizable in air, the gas relief valve 20 is mounted on the side wall of the container 10 in a position corresponding to the aperture 14 so as to close the aperture 14 in order to allow the gases filled in the container 10 to be discharged from the inside thereof yet to cause air to fail to penetrate into the container 10 from the outside.

First Embodiment

Figure 2:
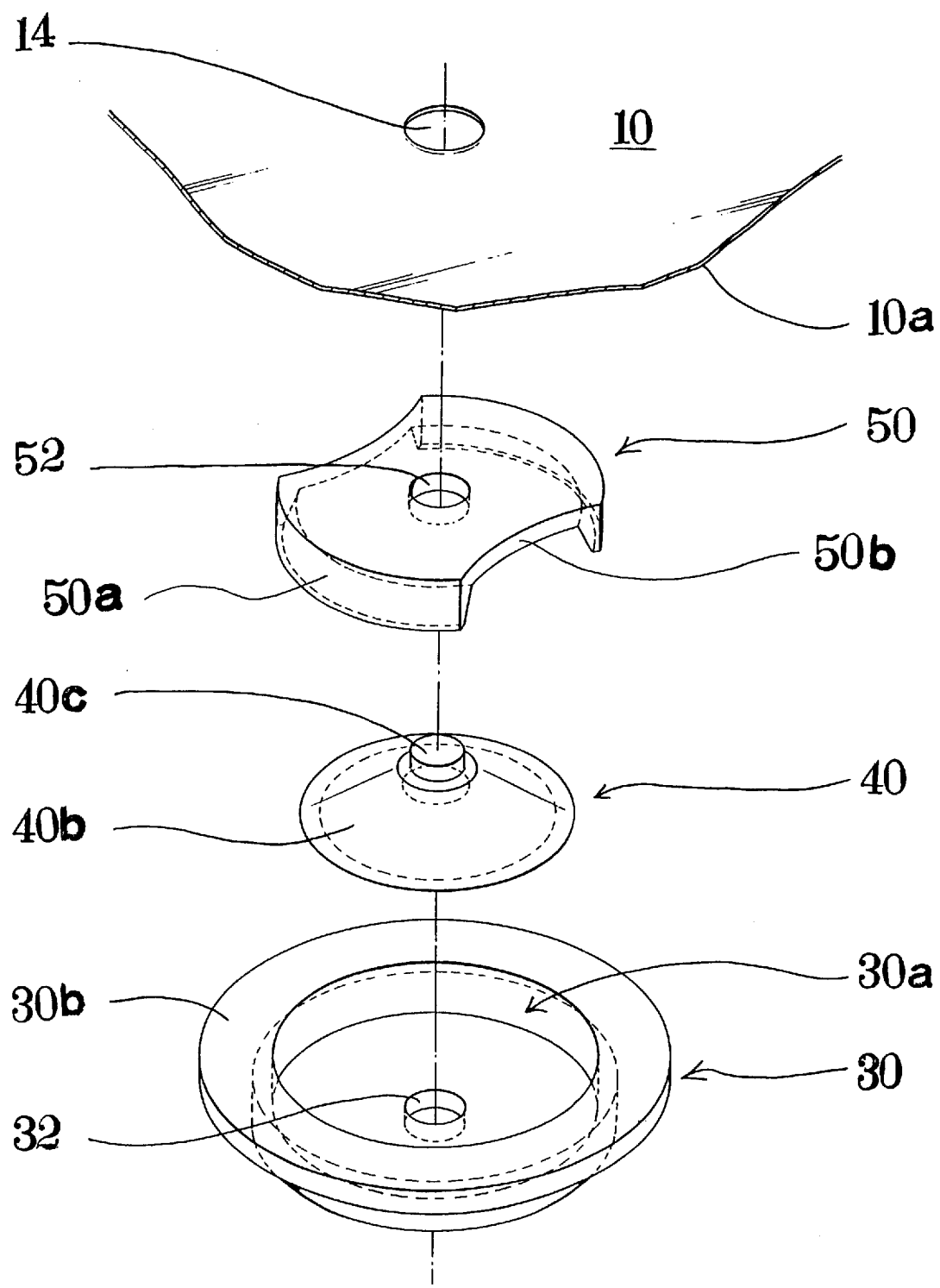
FIG. 2 is an exploded, perspective view showing elements of a first embodiment of a gas relief valve according to the present invention.
Figure 3:
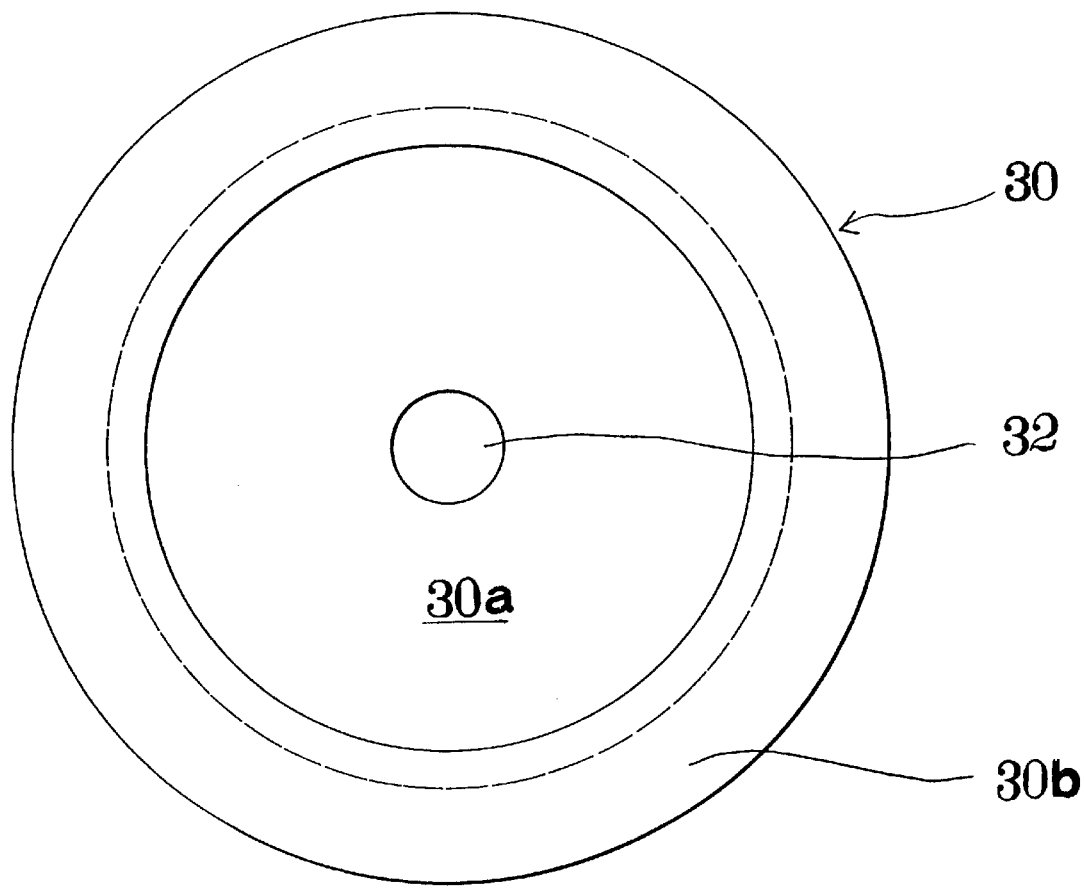
FIG. 3 is a plan view showing a casing acting as a support means constituting an element of the gas relief valve according to the first embodiment of the present invention.
Figure 4:
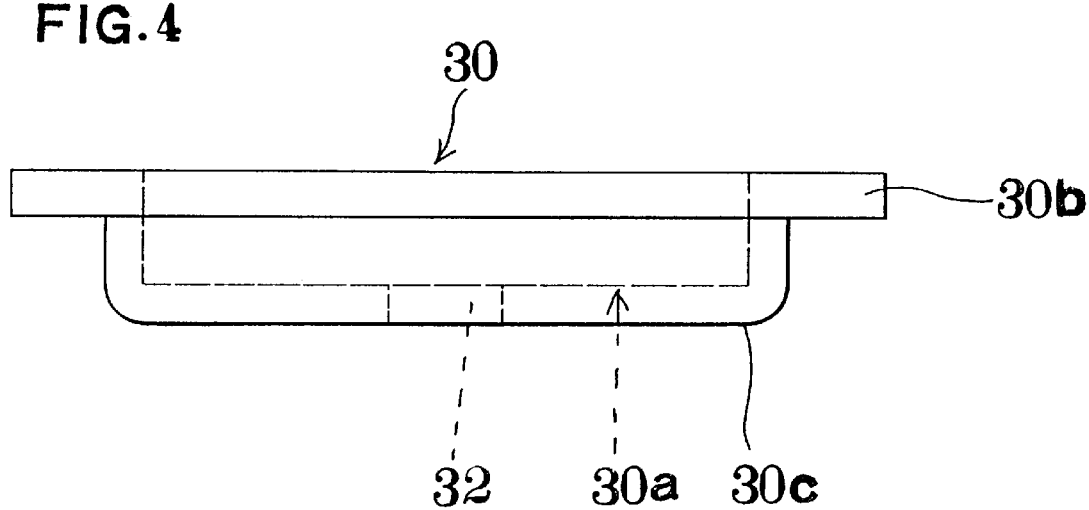
FIG. 4 is a side view of the casing of FIG. 3.
Figure 5:
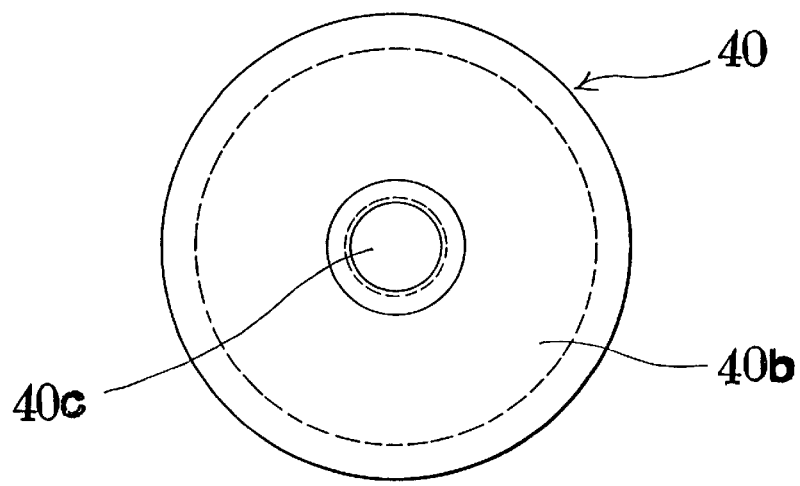
FIG. 5 is a plan view showing a valve member acting as an opening or closing means constituting an element of the gas relief valve according to the first embodiment of the present invention.
Figure 6:
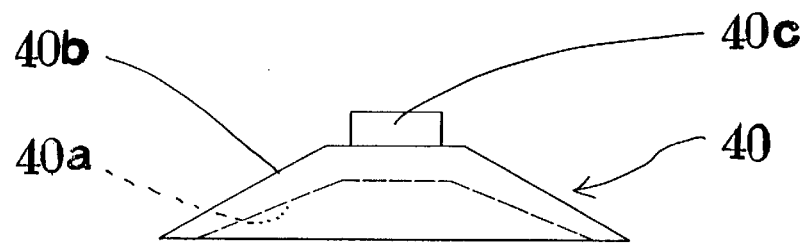
FIG. 6 is a side view of the valve member of FIG. 5.
Figure 9:
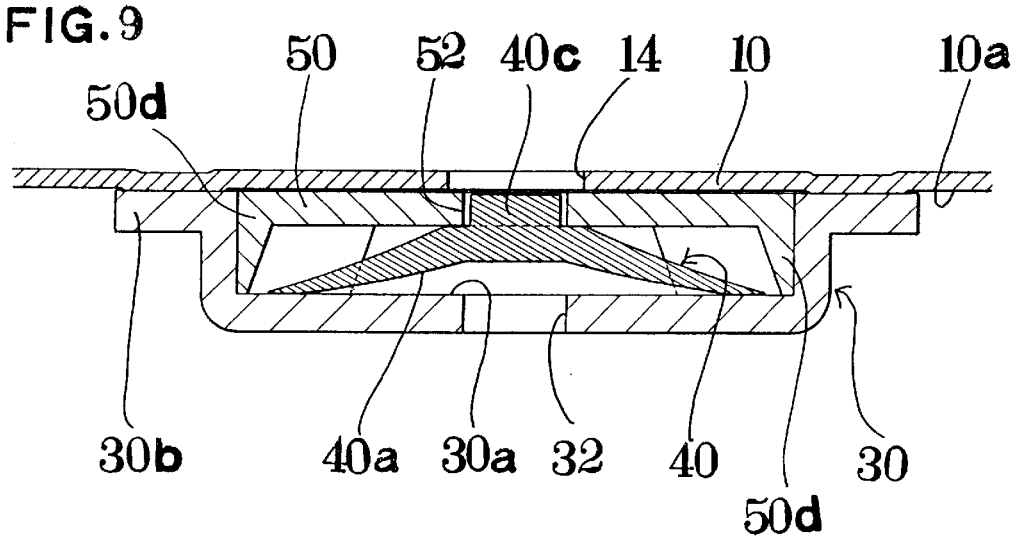
FIG. 9 is a longitudinally sectional view showing the gas relief valve according to the first embodiment of the present invention.
Figure 7:
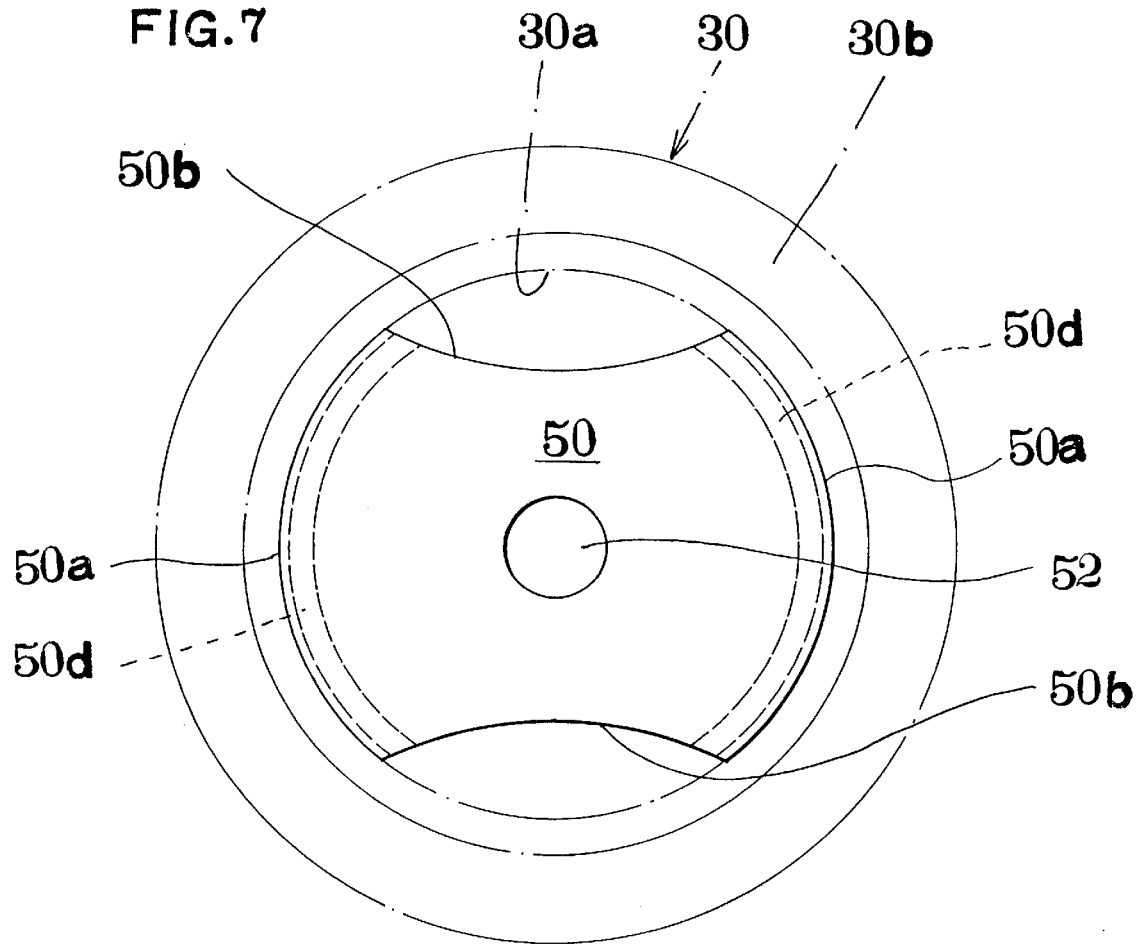
FIG. 7 is a plan view showing a pressing member acting as a pressing means constituting an element of the gas relief valve according to the first embodiment of the present invention and a position relationship of the pressing member in association with the other elements of the gas relief valve.
Figure 8:
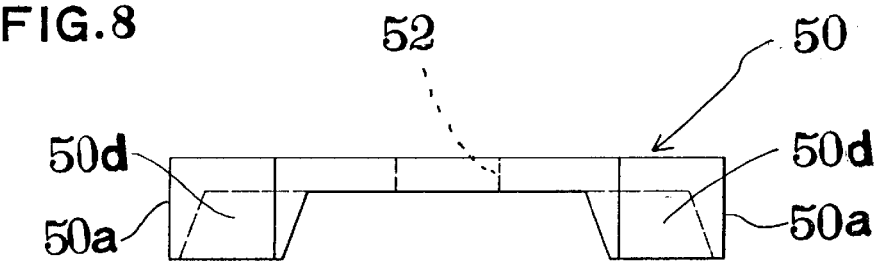
FIG. 8 is a side view of the pressing member of FIG. 7.

Now, a description will be made of the valve member of the gas relief valve according to the first embodiment of the present invention, with reference to the accompanying drawings. In the accompanying drawings, FIGS. 2 through 9 relate to the gas relief valve according to the first embodiment of the present invention, in which FIG. 2 is an exploded, perspective view showing elements of the gas relief valve according to the first embodiment of the present invention; FIG. 3 is a plan view showing the casing acting as the support means constituting an element of the gas relief valve according to the first embodiment thereof; FIG. 4 is a side view of the casing of FIG. 3; FIG. 5 is a plan view showing the valve member acting as the opening or closing means constituting an element of the gas relief valve according to the first embodiment thereof; FIG. 6 is a side view of the valve member of FIG. 5; FIG. 7 is a plan view showing the pressing member acting as the pressing means constituting an element of the gas relief valve according to the first embodiment thereof and a position relationship of the pressing member in association with the other elements of the gas relief valve; FIG. 8 is a side view of the pressing member of FIG. 7; and FIG. 9 is a longitudinal view in section showing the gas relief valve according to the first embodiment of the present invention.

As shown in FIGS. 2 through 8, the gas relief valve 20 according to the first embodiment of the present invention comprises a casing 30, a valve member 40 and a pressing member 50. The gas relief valve 20 constituted by those elements as described hereinabove is configured in such a structure that the valve member 40 is mounted on an upper surface of the casing 30 in an airtight fashion that no gaseous fluid such as carbon gases or air can flow out or in through and between the airtight-contact surfaces of the casing 30 and the valve member 40 in a usual state and that the pressing member 50 is further mounted on an upper surface of the valve member 40 so as to keep an airtight close contact of the valve member 40 with the casing 30 and to suppress a removal of the valve member 40 from the casing 30 in a usual state.

In the gas relief valve in accordance with the first embodiment of the present invention as shown in FIGS. 2 through 4, the casing 30 comprises a concave section 30a and a flange section 30b enclosing and disposed outside the concave section 30a. The concave section 30a is provided at its generally central portion with an aperture 32 which is structured in such a shape that gases generated from the contents 12 in the closed container 10 and filled therein can be discharged to the outside from the closed container 10 through the gas relief valve 20. On the other hand, an upper surface of the flange section 30b with the valve member 40 and the pressing member 50 mounted thereon is airtight attached or welded to an inner side wall surface 10a of the container 10 so as to enclose the aperture 14 of the container 10.

On a bottom surface of the gas relief valve 20, i.e. a bottom surface 30c of the concave section 30a of the casing 30, may be mounted, as needed, a preventive member such as, for example, a non-woven cloth or a screen, which can suppress the contents 12 or their crushed materials from leaking or penetrating from the inside of the container 10 through the aperture 32.

As shown in FIGS. 5 and 6, the valve member 40 is configured in such a concave shape that its inside portion 40a becomes gradually deeper and deeper as the center of the valve member 40 comes closer. On the other hand, the valve member 40 is structured in such a convex shape that its upper surface gradually extends upwardly along the concave line of the inside surface 40a and increases its convex height as the center of the valve member 40 comes closer. Further, as the valve member 40 is made of a flexible material, preferably a flexible material having elasticity, when it is pressed downwards from above onto an upper surface of the concave section 30a of the casing 30, an outer peripheral portion of the valve member 40 is caused to extend upwardly and outwardly and attach to the upper surface of the concave section 30a thereof in an airtight close state by suction. In other words, when the valve member 40 is attached to the concave section 30a of the casing 30 in such an airtight close manner as the concave section 40a of the valve member 40 is pressed downward from the above onto the concave section 30a of the casing 30, the concave section 40a thereof is caused to extend outwardly wider in diameter than the original width of the concave section 40a thereof before attachment to the casing 30. More specifically, as the valve member 40 is pressed downward from the above onto the casing 30, the air present in a gap formed between the upper surface of the casing 30 and the bottom surface of the valve member 40 is caused to squeeze through the gap, leading eventually to a vacuum state between the contact surfaces of the casing 30 and the valve member 40 and allowing the bottom surface of the valve member 40 to attach to the upper surface of the concave section 30a of the casing 30 in an airtight close state. In summary, the valve member 40 has the function as a sucker so that it can be airtight attached to the concave section 30a of the casing 30 when the valve member 40 is pressed downward onto the casing 30, thereby causing the air present in the gap to be squeezed through the contact area between the outer peripheral surfaces of the concave section 40a of the valve member 40 and the concave section 30a of the casing 30 to a vacuum state and attaching the valve member 40 to the casing 30 in an airtight close fashion.

If the valve member 40 is attached airtight to the casing 30 over its entire inside surface area, there may be the risk that gases filled in the closed container 10 gush out therefrom to detach the valve member 40 violently through the aperture 32 from the contact area of the casing 30 and the valve member 40 cannot be restored to its original and close state. In order to prevent such an occurrence, it is preferred that a concave portion is further disposed at a central bottom portion of the concave section 40a of the valve member 40 so as to provide a space even when the valve member 40 is pressed downward over its entire inside surface area onto the casing 30 in an airtight close manner and to provide the concave portion with the function of storing the gases flown out from and through the aperture 32 of the casing 30 temporarily. With the arrangement of the valve member 40 in association with the casing 30 in the manner as described herein-above, when the gases generated from the contents 12 of the container 10 are filled therein and the inner gas pressure therein is elevated to a predetermined level, the gases filled therein are caused to leak from and through the aperture 32 of the casing 30 and stored temporarily in the concave portion disposed at the central bottom portion of the valve member 40. Further, as the gases filled in the concave portion increase gradually, they push the central portion of the bottom surface of the valve member 40 upwardly to open gradually toward the outside from the concave portion, thereby forming a gas-flow gap or opening between the contact surfaces of the valve member 40 and the casing 30 and gradually growing the gas-flow gap into a through opening that causes the gases to flow out from the concave portion toward the outside of the valve member 40.

Once the gases filled in the container 10 have been discharged therefrom, the inner gas pressure within the closed container 10 is reduced to the original level before the gases have been discharged, in usual cases, to the pressure of the ambient atmosphere and the gas-flow gap formed between the valve member 40 and the casing 30 is caused to close again due to the restoring force of the valve member 40, thereby restoring the valve member 40 to its original shape in an airtight close state and suppressing air from entering therethrough into the closed container 10 from the outside. By choosing an appropriate material for the valve member 40, the restoring force of the valve member 40 can be adjusted to the predetermined inner gas level that forces the gases generated from the contents of the closed container 10 and filled therein to be discharged from the closed container 10 and that causes the valve member 40 to close the gas-flow gap in association with the casing 30.

The shape and the diameter of the valve member 40 are not limited to particular ones and they may be optionally set as long as the valve member 40 can achieve substantially the same functions as described hereinabove. The concave section 40a of the valve member 40 may be preferably of a circular shape in order to optimize its functions particularly as a sucker. The diameter of the concave section 40a thereof may be set to be smaller than the diameter of the concave section 30a of the casing 30 in order to allow a space apart from the outer peripheral edge of the concave section 40a of the valve member 40 with respect to an outer peripheral edge of the concave section 30a of the casing 30, when the concave section 40a is pressed downward onto the concave section 30a of the casing 30 and the diameter of the concave section 40a is caused to extend outwardly to become wider than its original width before the valve member 40 is pressed onto the casing 30. If the diameter of the extended inside surface 40a of the valve member 40 becomes substantially equal to the diameter of the outer peripheral edge of the concave section 30a of the casing 30 when the valve member 40 is mounted on the casing 30, there may cause the risk that the gases can hardly be discharged due to the fact that the outer peripheral edge of the concave section 40a of the valve member 40 comes into contact with the outer peripheral wall portion of the concave section 30a of the casing 30 when the concave section 40a thereof is caused to be pushed upward by the gases to be discharged from the closed container 10.

On the other hand, an upper surface 40b of the valve member 40 at its upper central portion 40c is of a cylindrical shape projecting upwards with a flat top surface. On the upper surface 40b thereof is further flattened out in an area around the cylindrically shaped and upwardly projecting, central upper portion 40c. The flattened area of the upper surface 40b is structured in such a manner that it readily and firmly abuts with the corresponding bottom surface portion of the side wall of the container 10 on which the gas relief valve 20 is mounted. The upper surface 40b is further structured so as to incline downward and outwardly from the outer peripheral edge of the flattened area.

For example, after the valve member 40 has been mounted on the casing 30 in the manner as described hereinabove, a pressing member 50 is mounted on the upper surface of the valve member 40. As specifically shown in FIGS. 2, 7 and 8, the pressing member 50 may be configured in such a manner that, on the one hand, its one side edge 50a and its other side edge 50a opposite thereto are shaped, for example, in a round manner so as to agree with the outer peripheral wall of the concave section 30a of the casing 30. On the other hand, the another side edge portion 50b and the opposite side edge portion 50b of the pressing member 50, in other words, its corresponding segment and the opposite segment, are cut away so as to provide a space from the inner peripheral edge of the flange section 30b of the casing 30 when the pressing member 50 is mounted on the casing 30. Further, the pressing member 50 is provided at the rounded side edge portions 50a each with a leg portion 50d. In summary, the pressing member 50 comprises a flat plate portion and two leg portions 50d disposed at the rounded side end portions thereof. In other words, the flat plate portion of the pressing member 50 may be generally rectangular in shape with one of pairs of the opposing side edges rounded outwardly so as to tightly engage with the outer peripheral wall of the concave section 30a of the casing 30 and with the other thereof extending straight or curved inward or outward providing a space apart from the outer peripheral wall of the concave section 30a thereof so as to allow a passage of the gases discharged from the container 10. It is to be noted, however, that the shape of the pressing member 50 is not restricted to a particular one as long as it can achieve the functions as sought to be gained by the present invention in a manner as will be described hereinafter.

The pressing member 50 is provided at its central part of the flat plate portion with an aperture 52 which in turn is so disposedas to receive and engage with the cylindrically shaped and upwardly projecting, upper central portion 40c of the valve member 40. The pressing member 50 is further disposed so as for its bottom part around the aperture 52 to abut with the upper central part of the upper surface 40b flattened out around the cylindrically shaped central upper projection 40c and to press the valve member 40 downward by the flexibility and the weight of the pressing member 50. The shape and the size of the aperture 52 are not restricted to particular ones as long as it can perform the functions as sought to be achieved by the present invention.

The pressing member 50 may be mounted on the upper surface 40b of the valve member 40 which in turn is mounted on the casing 30. Further, it may be mounted on the casing 30 with its rounded side edge portions 50a in abutment with or agreement with the equally rounded, inner side wall portions of the concave section 30a of the casing 30 and with its leg portions 50d in abutment with the outer peripheral part of the upper surface of the concave section 30a thereof. On the other hand, the cut-away portions 50b of the pressing member 50 are kept open without abutment with the inner side wall surface of the concave section 30a of the casing 30, thereby allowing the gases to pass through the opening. In this case, it is preferred that the bottom parts of the leg portions 50d are located outside and around the outermost peripheral edge of the concave section 40a of the valve member 40 mounted on the concave section 30a of the casing 30 in order to provide a gas-flow space around and between the leg portions of the pressing member 50 and the concave section 40a of the valve member 40. Further, it is preferred that the height of the leg portions of the pressing member 50 is substantially equal to the depth of the concave section 30a of the casing 30, in order to ensure a stable mounting of the pressing member 50 on the casing 30.

Once the gases have been released through and from the gas-flow gap formed between the outer peripheral portion of the valve member 40 and the concave section 30*a* of the casing 30, they flow upward and are released outside the pressing member 50 through and from an open space formed outside its cut-away portions 50*b* in association of the outer side wall surface of the concave section 30*a* thereof.

As described hereinabove and as shown in FIG. 7, the pressing member 50 is configured in such a manner that its outer arc-shaped peripheral edge segments are allowed to tightly engage with the corresponding arc-shaped, outer peripheral side wall portions of the concave section 30*a* of the casing 30, while the cut-away portion thereof provides a gas flow space in association with the outer arc-shaped peripheral side wall portions thereof, through and from which the gases are to be discharged. The gases discharged through the gas-flow space of the pressing member 50 are then discharged through and from the aperture 14 of the container 10 to the outside.

The pressing member 50 is made of a flexible material, preferably having elasticity. The pressing member 50 made of such a flexible material can adapt to transformation of the valve member 40 by its bending, when the valve member 40 has been pushed upward by the gases discharged through the contact surfaces of the valve member 40 and the casing 30. Further, when the flexible material for the pressing member 50 has elasticity and restores its shape to its original state from its bent form, the pressing member 50 can be restored to its original shape and press the valve member 40 downward to have the valve member 40 attached again to the casing 30 in an airtight fashion, when it has restored its shape to its original state from the state in which the pressing member 50 was bent upward by the gases discharged the contact surfaces of the casing 30 and the valve member 40. In addition, when the pressing member 50 is made of a flexible material having elasticity, the valve member 40 can be again allowed to be airtight attached to the concave section 30*a* of the casing 30 by the elasticity of the pressing member 50 even if the entire surface of the valve member 40 would have been detached from the upper surface of the concave section 30*a* thereof by the gases discharged from the container 10.

If the entire or greater portion of the contact surfaces between the concave section 30*a* of the casing 30 and the concave section 40*a* of the valve member 40 has been forced open by the gases penetrated into the gap of the contact surfaces through the aperture 14 of the container 10, there is the risk that the concave section 40*a* of the valve member 40 cannot come or little comes again into airtight contact with the concave section 30*a* of the casing 30 after the gases have been discharged from the container 10. In such a case, a non-drying liquid may be coated on the upper surface 30*a* of the casing 30 or the concave section 40*a* of the valve member 40 to thereby allow the surfaces thereof to attach again in an airtight manner. The portion on which to coat the non-drying liquid is not restricted to a particular one and the non-drying liquid can be coated on one or both of the concave section 40*a* of the valve member 40 and the concave section 30*a* of the casing 30. Further, although it can be coated on the entire or partial surface thereof, it is preferred that it is coated thereon leaving the portion of the contact surfaces of the concave section 30*a* of the casing 30 and/or the concave section 40*a* of the valve member 40 non-coated so as to make a gas-flow path formed readily therebetween. More specifically, when the gas-flow path is intended to be formed in a one way crossing from the aperture 32 disposed at the generally central portion of the casing 30 through the contact surfaces of the casing 30 and the valve member 40, the portion of the concave section 30*a* of the casing 30 and/or the concave section 40*a* of the valve member 40 are or is coated with the non-drying liquid without coating the portion thereof expected to form the gas-flow path.

Although the kind of the non-drying liquid is not restricted to a particular one, it is preferred that the non drying liquid does not adversely affect the contents 12 to be packed in the container 10 and it has such a degree of viscosity as retaining the contact between the concave section 30*a* of the casing 30 and the concave section 40*a* of the valve member 40 and failing to be opened when the inner gas pressure in the container 10 does not yet reach the predetermined level. A representative of the non-drying liquid may include, for example, polyethylene glycol and this liquid is preferably employed from the food-safety point of view.

In any case, the valve member 40 is made of a flexible material, preferably having elasticity. Further, it is preferred that the extent of flexibility is as high as capable of being bent readily by the pressure of the gases flowing through the gas-flow path to be formed between the contact surfaces of the concave section 30*a* of the casing 30 and the concave section 40*a* of the valve member 40. By choosing the extent of the flexibility and the elasticity of a material for the valve member 40, it is possible to determine the predetermined inner gas pressure of the gases that can be discharged from the container 10. In other words, when the valve member 40 is made of such a flexible material having flexibility as being bent by a low degree of the inner gas pressure, on the one hand, it can be bent by such a low inner gas pressure within the container 10 to thereby form a gas-flow path between the concave section 30*a* of the casing 30 and the concave section 40*a* of the valve member 40, even when the inner gas pressure in the container becomes slightly high, in other words, higher than the extent of flexibility that can withstand the predetermined inner gas pressure. When it is made of such a flexible material having flexibility as failing to be bent by a somewhat higher degree of the inner gas pressure, on the other hand, the predetermined inner gas pressure that defines the threshold of discharging the gases from the closed container 10 can be set to become somewhat higher and the container 10 can be adapted so as to withstand against a higher degree of the inner gas pressure.

In order to suppress the valve member 40 from being detached over its entire contact surface from the concave section 30*a* of the casing 30 and left open, it is also possible to let the gases flow in a predetermined direction through and between the contact surfaces of the casing 30 and the valve member 40. For this purpose, the casing 30 may be provided on the surface of the concave section 30*a* with a groove or grooves (not shown) extending from the aperture 32 toward the outside in the predetermined direction in which the gases are sought to flow through and between the contact surfaces of the casing 30 and the valve member 40 and are to be discharged from the outer peripheral edge portion of the concave section 30*a* thereof. Such a groove or grooves may also be likewise provided on the concave section 40*a* of the valve member 40 in substantially the same way as those provided on the concave section 30*a* of the casing 30 as described hereinabove. When the such groove or grooves is or are formed on each of the contact surfaces of the casing 30 and the valve member 40, they may be provided in equal or different directions. The provision of the such groove or grooves on the concave section 30*a* of the casing 30 and/or the concave section 40*a* of the valve member 40 in the predetermined directions enables the gases to be discharged in the predetermined directions and suppresses the valve member 40 from being detached over its entire or greater portion of the contact surface from the concave section 30a of the casing 30 and from being left detached without airtight attachment thereto. It can be noted, however, that when the non-drying liquid is employed for reinforcement of the close attachment between the concave section 30a of the casing 30 and the concave section 40a of the valve member 40, no groove or grooves may be provided on either of the contact surfaces of the casing 30 and the valve member 40.

It is further to be noted that the valve member 40 can be restored to its original position and brought again into airtight contact with the concave section 30a of the casing 30 even if it has been detached therefrom over its entire or greater portion of the contact surface and left open, when the pressing member 50 is made of a flexible material having such a high degree of flexibility as capable of pressing the valve member 40 downward and causing the concave section 40a of the valve member 40 to be attached again to the concave section 30a of the casing 30 in an airtight state.

A description will now be made of procedures of mounting a gas relief valve according to the present invention on a container. Specifically, an example of the procedures of mounting the gas relief valve 20 according to the present invention on the container 10 will be described with reference to FIG. 9.

As shown in FIG. 9, the valve member 40 is mounted on the casing 30 by pressing the concave section 40a downwards on the concave section 30a so as to cause the outer peripheral edge portion of the concave section 40a in contact with the concave section 30a to expand outwardly while releasing the air from the contact surfaces therebetween and to be attached airtight to the concave section 30a. Onto the top of the valve member 40 disposed on the casing 30 is then mounted the pressing member 50 so as to allow its aperture 52 to engage with the cylindrically shaped portion 40c at the upper central section of the valve member 40. In this case, it is preferred that the outer peripheral, arc-shaped edge segments 50a of the pressing member 50 are engaged with the corresponding inner side wall portions of the concave section 30a of the casing 30 so tightly as to cause the pressing member 50 to fail to detach from the casing 30 and the valve member 40. After the pressing member 50 has been assembled with the valve member 40 and the casing 30, the assembled elements are then mounted on the container 10 by coating an upper surface of the flange section 30b of the casing 30 with an appropriate adhesive and, as needed, a portion of the outer peripheral and upper edge portion 50a of the pressing member 50 engaged with the concave section 30a of the casing 30 and then by attaching the casing 30 to the inner side wall surface of the container 10 or by melting the upper surface of the flange section 30b of the casing 30 and then attaching the casing 30 to the inner side wall surface thereof. In attaching the gas relief valve 20 to the container 10, the aperture 52 of the pressing member 50 is disposed so as to be generally concentric with the aperture 14 of the container 10, thereby causing the gases discharged through and from the gas relief valve 20 to be eventually discharged from the container 10 to the outside. As needed, the non-drying liquid may be coated at a predetermined portion or portions of one or both of the concave section 30a of the casing 30 and the concave section 40a of the valve member 40 before the valve member 40 is mounted on the casing 30.

By structuring the gas relief valve in accordance with the first embodiment of the present invention in the way as described hereinabove, when the inner gas pressure of the gases filled in the container 10 is elevated to the predetermined level or higher by the gases generated from the contents in the closed container 10 and filled therein, the gases are caused to flow or penetrate into a space or a gap between the upper surface 30a of the casing 30 and the concave section 40a of the valve member 40 through the aperture 32 and pushing the concave section 40a thereof upwardly to thereby create a gap therebetween and gradually expand an opening of the gap until the gap reaches the outer peripheral edge of the concave section 40a to eventually communicate with the outside of the valve member 40 and opens throughout the contact surfaces as a through gas-flow path through and from which the gases filled in the closed container 10 are to be discharged. Once they have been discharged from the valve member 40, the gases are allowed to flow upwardly along the upper surface 40a of the valve member 40. The gases are then passing through a space formed between the concave portion 30a of the casing 30 and the cut-away side portion 50b of the pressing member 50 and they are discharged from the gas relief valve 20 through a gap formed between the valve member 40c of the valve member 40 and the aperture 52 of the pressing member 50. The gases are eventually discharged through the aperture 14 formed on the side of the container 10 into the outside. Once the gases generated from the contents 12 in the closed container 10 and filled therein have been discharged from the valve member 40 into the outside, the gas-flow path created is closed automatically by the action of the valve member 40 and the pressing member 50, thereby causing the inner surface 40a of the valve member 40 to be brought back again into airtight contact with the inner surface 30a of the casing 30 in substantially the same manner as before discharging the gases filled in the closed container 10. In this case, if a non-drying liquid is coated on a surface portion between the concave portion 30a of the casing 30 and the inner surface 40a of the valve member 40, the airtight recontact between the concave portion 30a of the casing 30 and the inner surface 40a of the valve member 40 can be ensured more certainly.

Second Embodiment

Figure 10:
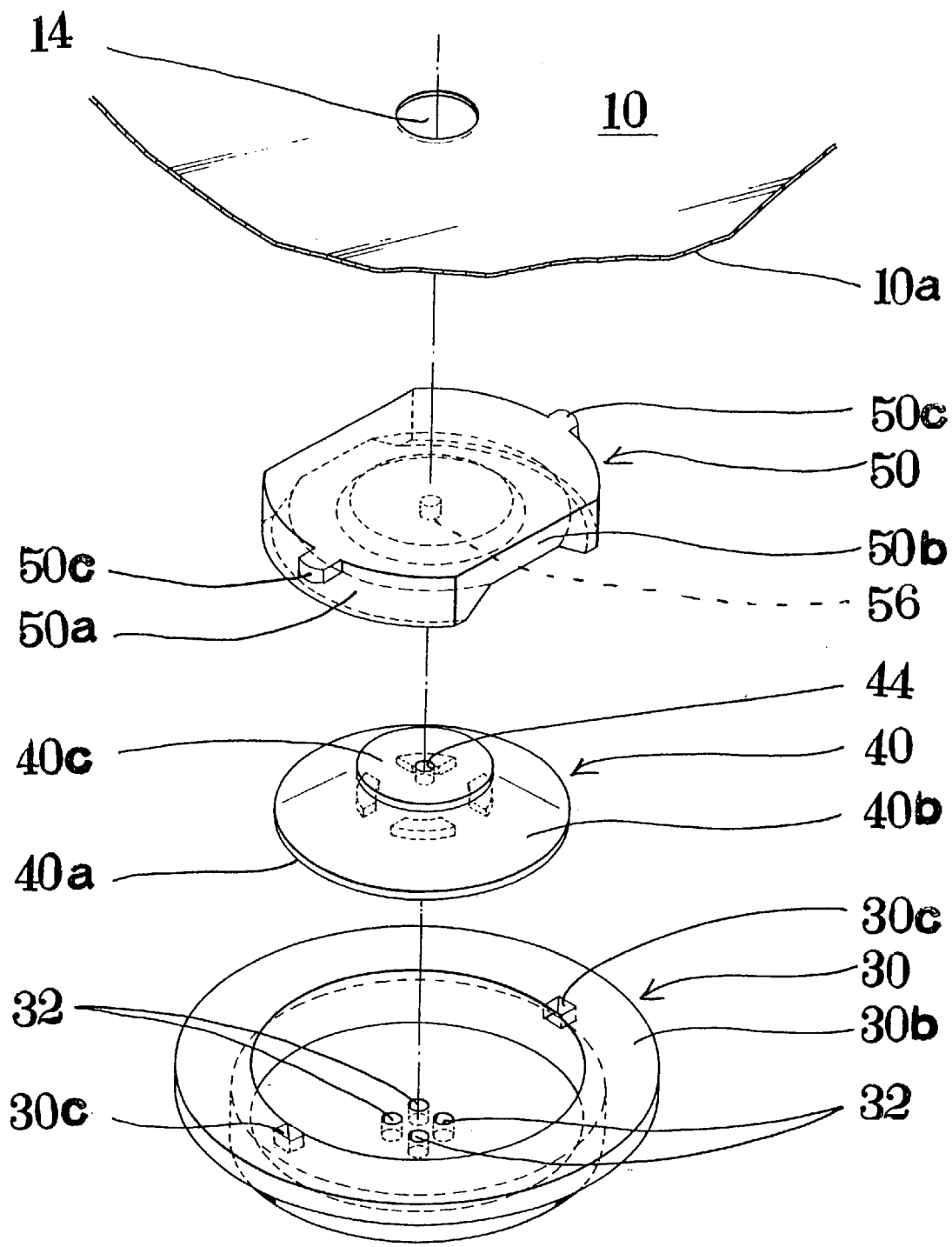
FIG. 10 is an exploded, perspective view showing elements of a second embodiment of a gas relief valve according to the present invention.
Figure 11:
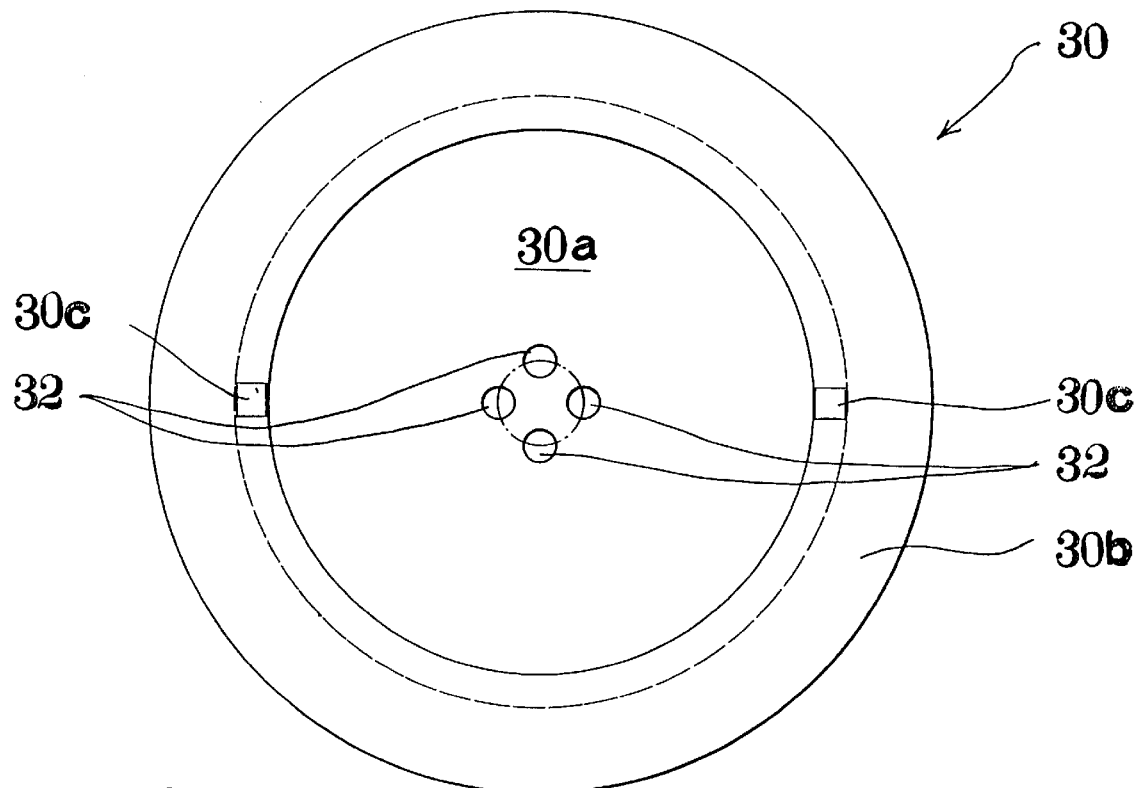
FIG. 11 is a plan view showing a casing constituting the gas relief valve according to the second embodiment of the present invention.
Figure 12:
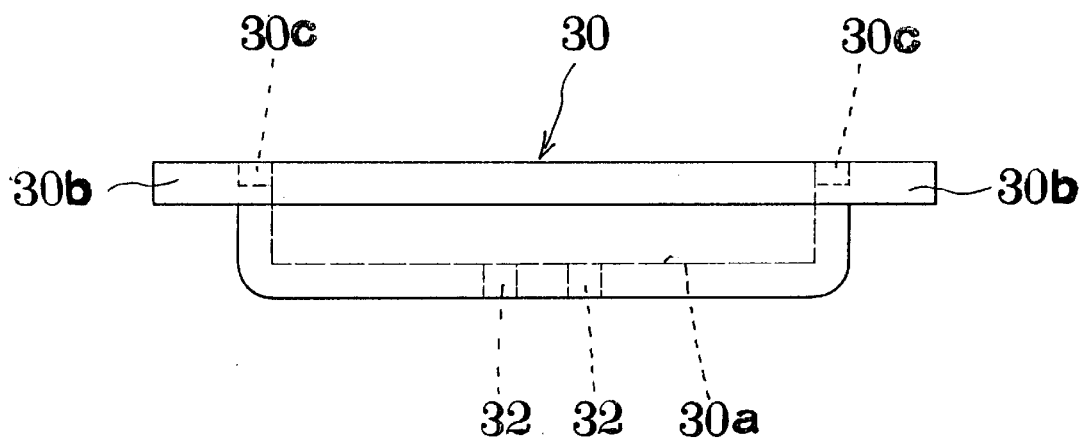
FIG. 12 is a side view of the casing of FIG. 11.
Figure 13:
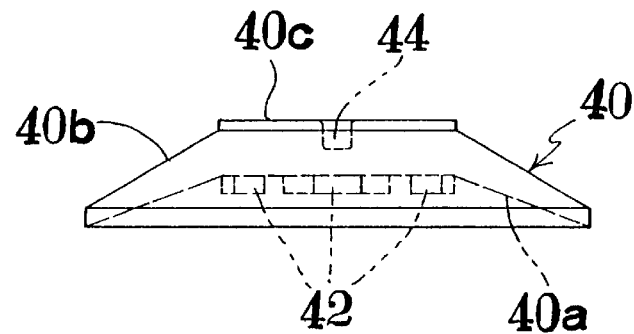
FIG. 13 is a side view showing a valve member constituting an element of the gas relief valve according to the second embodiment of the present invention.
Figure 14:
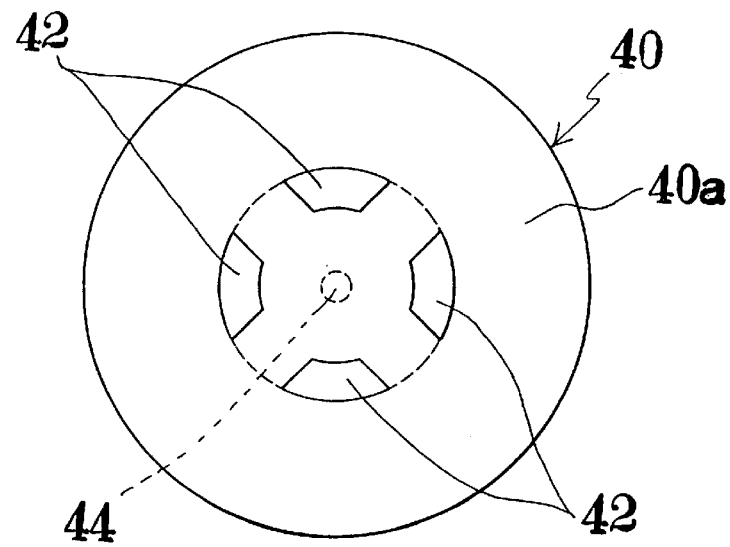
FIG. 14 is a bottom view of the valve member of the gas relief valve according to the second embodiment of the present invention.
Figure 17:
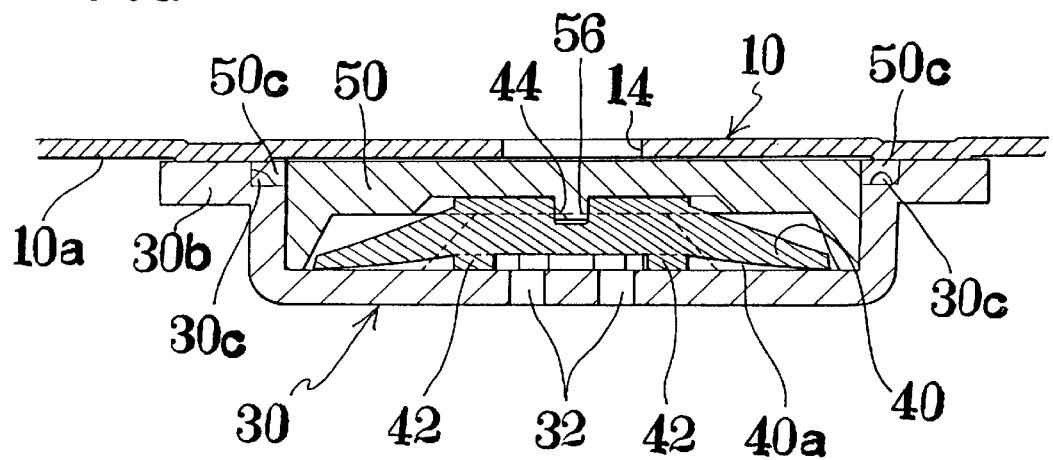
FIG. 17 is a longitudinally sectional view showing the gas relief valve according to the second embodiment of the present invention.
Figure 15:
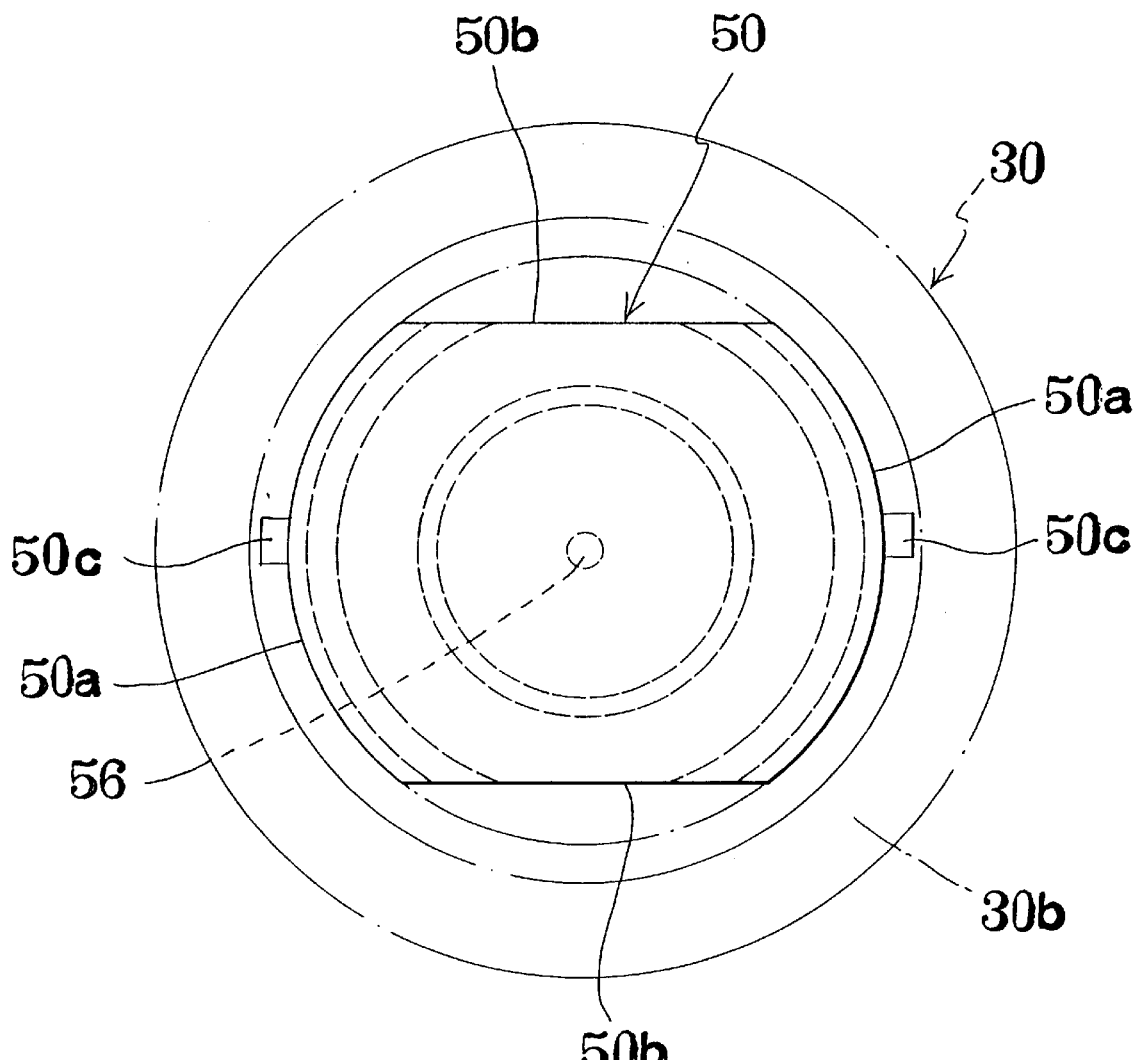
FIG. 15 is a plan view showing a pressing member constituting an element of the gas relief valve according to the second embodiment of the present invention.
Figure 16:
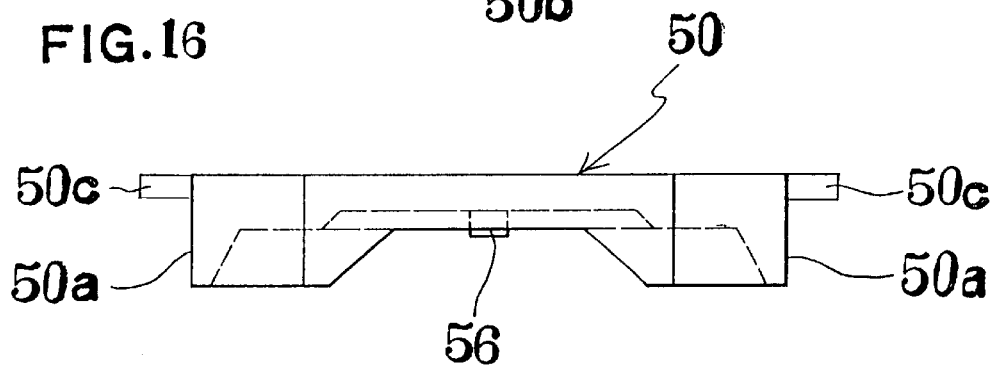
FIG. 16 is a side view of the pressing member of the gas relief valve according to the second embodiment of the present invention.

A specific description will now turn to the gas relief valve according to the second embodiment of the present invention with reference to FIGS. 10 to 17. FIG. 10 is an exploded, perspective view showing the elements of the gas relief valve according to the second embodiment of the present invention; FIG. 11 is a plan view showing the casing constituting the gas relief valve according to the second embodiment thereof; FIG. 12 is a side view of the casing of FIG. 11; FIG. 13 is a side view showing the valve member constituting the element of the gas relief valve according to the second embodiment thereof; FIG. 14 is a bottom view of the valve member of the gas relief valve according to the second embodiment thereof; FIG. 15 is a plan view showing the pressing member constituting the element of the gas relief valve according to the second embodiment thereof; FIG. 16 is a side view of the pressing member of the gas relief valve according to the second embodiment thereof; and FIG. 17 is a longitudinally sectional view showing the gas relief valve according to the second embodiment of the present invention. In the drawings, the common elements are provided with the same reference numerals and a duplicate description of those common elements is omitted from the following description for brevity of explanation.

The gas relief valve 20 for a container for storing contents generating gases is a modified example of the gas relief valve according to the first embodiment thereof. In the gas relief valve according to the second embodiment thereof, as shown in FIGS. 10 to 12, the casing 30 is configured in such a manner that its upper surface 30*a* is in a concave shape over its roughly entire surface area and that a plurality of apertures 32 are formed in its generally middle portion of the upper surface 30*a* thereof. The second embodiment of the gas relief valve shows an example of the gas relief valve having four apertures 32, however, it can be noted that the number of apertures 32 is not limited to this embodiment and it may be one or plural other than four. Further, the casing 30 constituting the gas relief valve 20 according to the second embodiment of the present invention is provided with a pair of grooves 30*c* facing each other with the aperture 32 formed between on the inner side on the upper surface of the flange section 30*b* thereof, more specifically, on the inner peripheral side portions on the upper surface on the side of the concave section 30*a* thereof. The grooves 30*c* are disposed so as to be engaged with a pair of lengthwise extending projections 50*c* provided on the outer peripheral edges of the pressing member 50 in a way as will be described hereinafter. It can be briefly described that the casing 30 of the gas relief valve according to the second embodiment of the present invention differs from the one according to the first embodiment in that plural apertures 32 are disposed at a central portion of the concave section 30*a* and the grooves 30*c* are provided on the inner upper sides of the flange section 30*b*.

As shown specifically in FIGS. 10, 13 and 14, the valve member 40 constituting the gas relief valve 20 according to the second embodiment of the present invention is configured in such a way that its bottom surface, that is, the concave section 40*a*, is of a concave shape so as to allow its depth to increase gradually as the position comes closer to the central portion from the outer peripheral edge portion. The valve member 40 may be provided at the central portion of the concave section 40*a* thereof with a plurality of leg portions 42 which may in turn be disposed so as to surround the plural apertures 32 of the casing 30 concentrically when the valve member 40 is mounted on the casing 30. When the valve member 40 is mounted on the concave section 30*a* of the casing 30, the leg portions 42 provided on the inner surface 40*a* of the valve member 40 can support the valve member 40 with its bottom portion in close contact with the upper surface of the concave section 30*a* and they form a space among them which can demonstrate the function of storing gases discharged from the container 10 therein. Further, as the valve member 40 is made of a flexible material, it can be attached to the upper surface 30*a* of the casing 30 in a highly airtight state by setting the height of each of the leg portions 42 so as to be shorter than the depth of the concave inner surface 40*a* of the valve member 40, because the portion of the outer peripheral edge portion of the concave section 40*a*, which is in contact with the concave section 30*a* of the casing 30, is pushed upwardly and the outer peripheral portion of the concave section 40*a* is expanded outwardly, when the inner surface 40*a* of the valve member 40 is pressed upon the concave section 30*a* of the casing 30. At the same time, the central portion of the valve member 40 can keep the such space by the aid of the leg portions 42 without contact with the concave section 30*a* of the casing 30 and the space can serve as a temporary reservoir of the gases discharged from the container 10.

On the other hand, as shown in FIGS. 10, 13, 14 and 17, the central portion 40*c* on the upper surface of the valve member 40 may be flat with a concave portion 44 provided at its middle portion. The concave portion 44 is shaped so as to be engaged with a projection 56 disposed on the bottom portion of the pressing member 50 extending downwards, as will be described hereinafter, when the pressing member 50 is mounted on the upper portion of the valve member 40.

Further, as shown in FIGS. 13 to 17, the pressing member 50 is mounted on the upper surface of the valve member 40 with the purpose to press the valve member 40 downwards. In the second embodiment, the pressing member 50 may be, for example, in a four-sided shape. A pair of the opposite sides 50*a* thereof may be, for example, each in an arc-shaped form so as to comply with an arc-shaped segment of the outer peripheral edge section of the concave section 30*a* of the casing 30 and have a diameter substantially equal to that of the concave section 30*a* thereof. With the arrangement of the pressing member 50 with its outer arc-shaped peripheral segments, the pressing member 50 can be mounted on the valve member 40 in a tight manner. On the other hand, another pair of the other opposite sides 50*b* thereof may be, for example, each in a straight or inward or outward curved shape so that, when the pressing member 50 is mounted on the casing 30, the sides 50*b* of the pressing member 50 can create spaces at both sides in association with the opposing inner periphery portions of the flange section 30*b* of the casing 30, thereby allowing the gases discharged through the contact surfaces of the valve member 40 and the pressing member 50 to be discharged through and from the spaces. Further, the pressing member 50 is provided on the outer surfaces of the arc-shaped side segments 50*a* with a pair of projections 50*c* extending outwardly, which in turn are disposed so as to engage with the grooves 30*c* formed on the flange section 30*b* of the casing 30, when the pressing member 50 is to be mounted on the casing 30 with the valve member 40 disposed thereon. In addition, the pressing member 50 is provided at the middle portion on its bottom surface with the projection 56 extending downwards so as to be engaged with the groove 44 disposed at the central portion 40*c* on the upper surface of the valve member 40. This structure can fix the pressing member 50 on the upper surface of the valve member 40 while pressing the valve member 40 downwards.

When the pressing member 50 is mounted on the upper side of the valve member 40 in the manner as described hereinabove, the valve member 40 can be attached to the concave section 30*a* of the casing 30 in a tight way so that the highly airtight state can be held between the valve member 40 and the casing 30. This airtight state can be held when the valve member 40 and the casing 30 are disposed in a usual way or when the inner gas pressure of the gases within the container 10 is below the predetermined pressure level. Once the inner gas pressure of the gases within the container 10 is elevated to and above the predetermined pressure level as the gases are filled therein, however, the gases leaked from the aperture 14 of the container 10 are discharged from the aperture 32 of the casing 30 into a space formed between the contact surfaces of the upper surface 30*a* of the casing 30 and the inner surface 40*a* of the valve member 40, followed by gradually opening the contact surfaces to thereby create a gas-flow path therebetween. The gases filled in the closed container 10 are then discharged through the gas-flow path into the outside of the valve member 40 and through the gap formed between the valve member 40 and the pressing member 50 outside the valve member 40, thereby being discharged outside the container 10. Once the gases generated from the contents 12 of the container 10 and filled therein have been discharged into the outside of the container 10 and the inner gas pressure within the container 10 is reduced to ambient pressure or below the predetermined gas pressure level, the valve member 40 is allowed to automatically come into contact with the casing 30 to thereby close the gas-flow path formed therebetween, thereby returning and restoring the contact status between the casing 30 and the valve member 40 to its originally airtight state.

It is to be noted herein that the inner gas pressure of the gases to be discharged from the container 10 can be adjusted by appropriately selecting the materials to be used for the valve member 40 and the pressing member 50. When the valve member 40 is made of a material having a high degree of flexibility, in other words, a material being so highly flexible as to be bendable at a low pressure, on the one hand, the gases generated from the contents of the closed container 10 and filled therein can be discharged even when the inner gas pressure is elevated to a gas pressure slightly higher than ambient pressure. When the valve member 40 is made of a material having a low degree of flexibility, in other words, a material being so less flexible as to be bendable at a somewhat high pressure, on the other hand, the gases can be discharged only when the inner gas pressure is elevated to a gas pressure as high as an inner gas pressure level predetermined to be higher than the level set when such a material with a lower flexibility is employed. The same thing can be said of the material to be used for the pressing member 50. When the material of the pressing member 50 is hard and less flexible, the pressing member 50 cannot be pushed upwardly unless the valve member 40 would be raised upwardly by a somewhat higher inner gas pressure. On the other hand, when the pressing member 50 is made of a soft and highly flexible material, it can be raised at a slightly higher inner gas pressure by the valve member 40 which in turn has been raised upwardly. In this case, the predetermined inner gas pressure level can be set to be a low value. By combining different material kinds of the valve member 40 and the pressing member 50, each having different degrees of flexibility, the predetermined inner gas pressure levels can be adjusted to such an extent as sought to be set in accordance with the present invention. This can be applied, too, to the gas relief valves according to other embodiments which follow.

The gas relief valve according to the second embodiment of the present invention can be mounted on the inner side wall surface of a container in substantially the same manner as the gas relief valve according to the first embodiment thereof. The gas relief valve 20 may be assembled by placing the valve member 40 on the concave section 30a of the casing 30 and then mounting the pressing member 50 on the upper side of the valve member 40 while pressing the valve member 40 downwards upon the upper surface of the concave section 30a of the casing 30. Adhesive or the like is coated on an upper surface of the flange section 30b of the casing 30 and the assembled gas relief valve is attached on the inner side surface of the container 10 so as to enclose the aperture 14 of the container 10. By mounting the gas relief valve on the inner side wall surface 10a of the container 10, the gases can be discharged from the container 10 through the attached surfaces of the valve member 40 and the casing 30 and then through the gap formed between the upper surface of the pressing member 50 and the inner side surface 10a of the container 10, followed by discharging the gases filled in the gas relief valve outside the container 10 via the aperture 14 thereof.

Third Embodiment

A description will be made of a gas relief valve according to the third embodiment of the present invention with reference to FIGS. 18 and 19. It is to be noted herein that the basic structure of the gas relief valve 20 according to the third embodiment is substantially the same as that of the gas relief valve 20 according to the second embodiment so that the identical or similar elements are provided with the identical reference numbers and symbols and a duplicate description of those identical or similar elements will be omitted for brevity of explanation.

Figure 18:
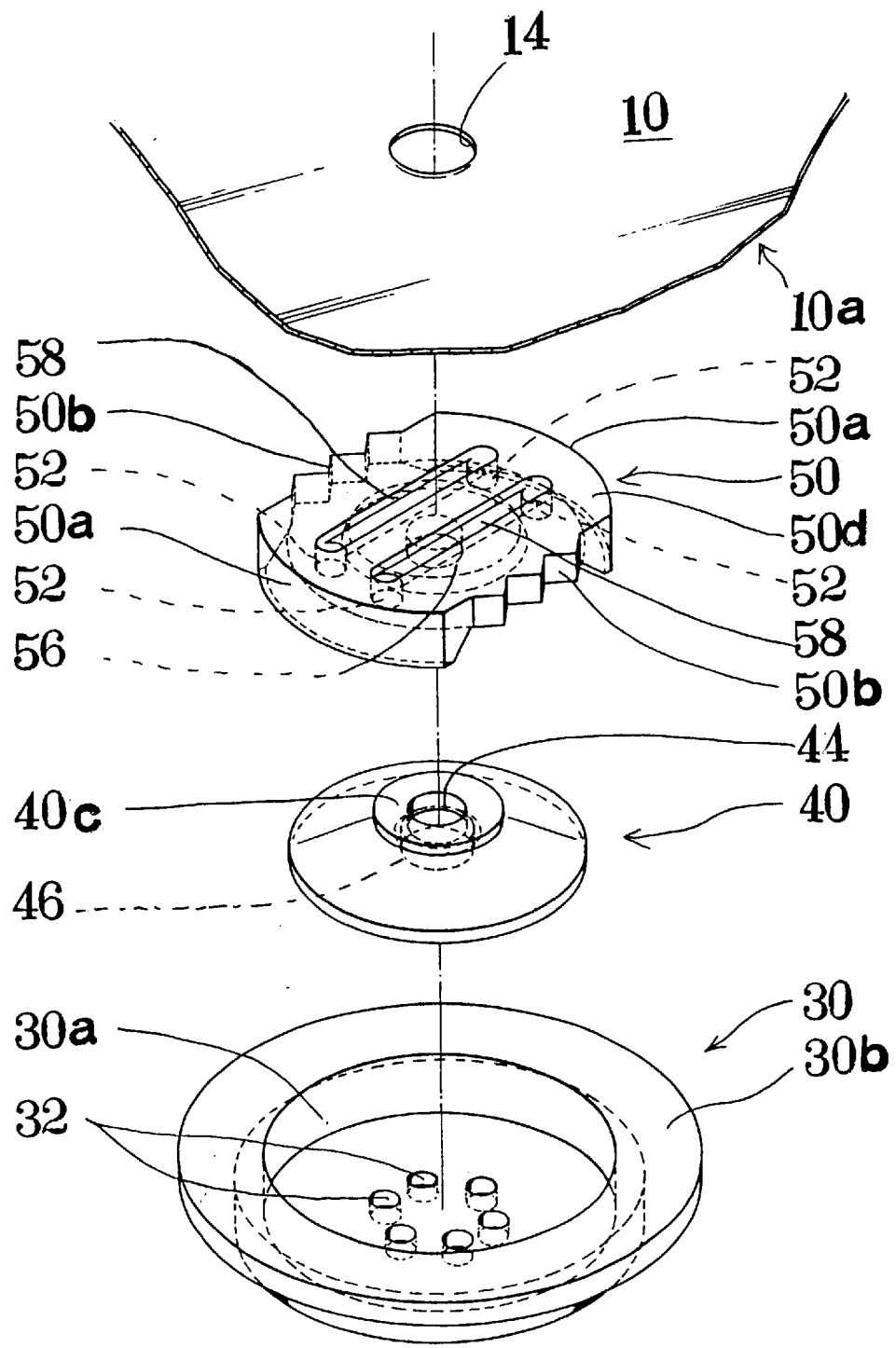
FIG. 18 is an exploded, perspective view showing elements of a third embodiment of a gas relief valve according to the present invention.

As shown in FIG. 18, the gas relief valve 20 according to the third embodiment of the present invention basically comprises a casing 30 as a support means, a valve member 40 as an opening or closing means, and a pressing member 50 as a pressing means. The gas relief valve 20 consisting the casing 30, the valve member 40 and the pressing member 50 is attached to or welded to the inner side wall surface 10a of the container 10.

Figure 19:
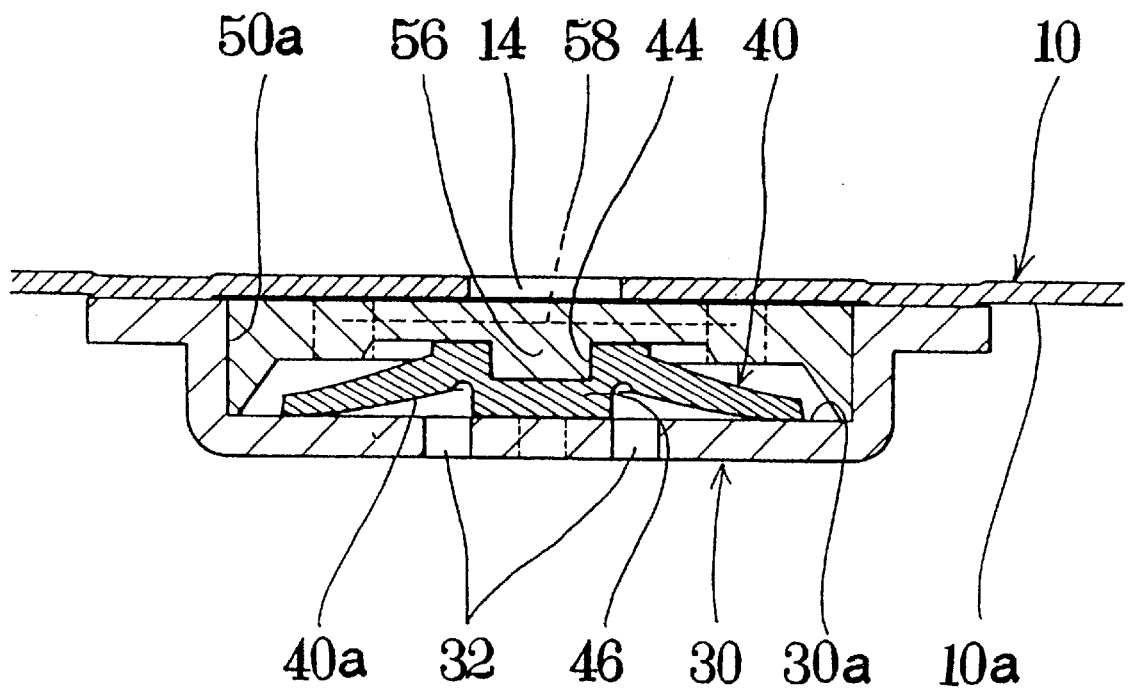
FIG. 19 is a sectional view showing the gas relief valve according to the third embodiment of the present invention.

As shown in FIGS. 18 and 19, the casing 30 acting as one element constituting the gas relief valve 20 according to the third embodiment is substantially equal in basic structure to the casing 30 of the gas relief valve according to the second embodiment with the major exception that no groove portion is formed in the inner peripheral edge portions of its flange portion 30b of the casing 30 and that a plurality of the apertures 32, for example, six holes in this embodiment, are formed concentrically at a central portion of the concave section 30a.

Further, as shown in FIG. 19, the valve member 40 acting as another element constituting the gas relief valve 20 according to the third embodiment is similar in basic structure to the valve member 40 of the gas relief valve according to the second embodiment with the major exception that it may be, for example, in a circular shape so as to be adaptable to the concave portion 30a of the casing 30 on which the valve member 40 is to be mounted. It is to be noted, however, that the shape of the valve member 40 is not limited to a circular shape and it may be in any form as long as the valve member 40 can be adapted to the casing 30. The valve member 40 is provided at its central top portion 40c with a concave portion 44 and at its central bottom portion with a projecting portion 46. The projecting portion 46 of the valve member 40 in turn is so arranged as to be smaller in diameter than the diameter of a virtually concentric circle of apertures 32 of the casing 30 and to be disposed within the virtually concentric circle thereof, when mounted on the casing 30. Further, the valve member 40 may be provided so as to create a clearance around the projecting portion 46, even when the valve member 40 is mounted on the concave section 30a of the casing 30 in an airtight manner. The clearance can further act as a reservoir for the gases discharged through the holes 32 of the casing 30 from the container 10. In addition, the height of the projecting portion 46 may be set to be shorter than the vertically sectional depth of the concave section 40a in its original state before mounting on the casing 30. This setting of the depth of the projecting portion 46 allows the bottom surface 40b of the valve member 40 to abut with the upper surface 30a of the casing 30 in an airtight manner, as with the gas relief valve 20 according to the second embodiment of the present invention.

Likewise, the pressing member 50 of the gas relief valve according to this embodiment has substantially the same basic configuration as that according to each of the first and second embodiments. The pressing member 50 may be in such a shape that, on the one hand, its both opposing side edge sections 50a may be outward curved, for example, in an arc-shaped way so as to be adaptable to the inner arc-shaped edge segments of the concave section 30a of the casing 30 and, on the other hand, the both opposing side edge sections 50b locating at both sides between the opposing side edge sections 50a may be straight or inward or outward curved, for example, in an arc-shaped way so as to form a space between each of the side edges 50*b* and the corresponding arc-shaped side edge segments 50*a* and the inner peripheral side wall edge of the flange section 30*b* of the casing 30. Furthermore, as shown in FIG. 18, the side edge sections 50*b* of the pressing member 50 may be provided, for example, with notches, such as the teeth of a saw. Such notches present the advantage that the pressing member 50 can be held with ease when mounting the pressing member 50 of the casing 30.

In addition, the pressing member 50 may be provided at its opposing outward arc-shaped side segments with a plurality of apertures 52, for example, a pair of apertures 52 on each side, although the number of apertures 52 is not restricted to a particular one. Between each of pairs of the apertures 52 disposed on the opposing sides 50*a* may be provided a groove 58 extending along the diameter of the pressing member 50, which in turn makes it easy to mount the pressing member 50 on the casing 30. By clamping the notched sides 50*b*, they can be contracted in inner directions to a smaller width because the groove 58 are also contracted to a smaller width. The deformation of the notched sides 50*b* causes bending both side edge portions of each of the arc-shaped edge segments 50*a* inward or outward, thereby allowing the pressing member 50 to be mounted on the casing 30 easily and the outward arc-shaped edge segments 50*a* thereof to abut with the inner peripheral edge of the concave section 30*a* tightly when the clamping of the pressing member 50 has been released. Further, the downward extending projection 56 disposed at the central portion on the bottom surface of the pressing member 50 may be engaged with the concave portion 44 disposed at the central portion on the upper surface 40*c* of the valve member 40 when the pressing member 50 is to be mounted on the valve member 40.

Now, a description will be made of the way of assembling the elements constituting the gas relief valve according to the third embodiment and the way of mounting the gas relief valve 20 on the container 10.

First, the valve member 40 is placed so as to dispose the projection 46 on an upper surface of the concave section 30*a* of the casing 30 so as to concentrically enclose the apertures 32 of the casing 30. More specifically, when the valve member 40 is mounted on the casing 30, the apertures 32 are disposed concentrically with and outside the projection 46 thereof. Thereafter, the pressing member 50 is mounted on the valve member 40 while pressing the valve member 40 downward on the concave section 30*a* of the casing 30. In this case, the projection 56 of the pressing member 50 is engaged with the concave portion 44 on the upper surface 40*c* of the valve member 40 and the valve member 40 is pressed downward to cause the projection 46 on its rear surface to come into airtight contact with the upper surface of the concave portion 30*a* of the casing 30. When the valve member 40 is mounted airtight on the concave section 30*a* of the casing 30, the outward peripheral portion of the valve member 40 is pressed downward onto the upper surface of the concave section 30*a* thereof and expands towards the outside, that is, expand its diameter into a diameter greater than its original diameter before mounting, because the projection 46 disposed on the centrally rear surface of the valve member 40 is shorter than the original depth of the concave portion of the valve member 40.

The gas relief valve 20 is then mounted on the upper portion of the inner side wall surface 10*a* of the container 10. One way of mounting the gas relief valve 20 on the container 10 may comprise coating an adhesive on the upper surface of the flange portion 30*b* of the casing 30 in such a state that the gas relief valve 20 is arranged and assembled in the manner as described hereinabove and attaching the coated upper surface of the flange portion 30*b* thereof to the inner side surface 10*a* of the container 10 so as to become generally concentric with the aperture 14 of the container 10 to thereby ensure a gas passage. It is to be noted herein, however, that it is not necessary to strictly set the positional relationship of the aperture 14 relative to the gas relief valve 20 and it is satisfactory to communicate the aperture 14 with the gas passage of the gas relief valve 20, thereby enabling the gases to be discharged from the container 10.

A description will then turn to the manner in which the gases filled in the container 10 are discharged therefrom through the gas relief valve 20 according to the third embodiment of the present invention mounted thereon.

When the gases generated from the contents 12 therein are filled in the container 10 and the inner gas pressure is elevated to the predetermined level or higher, they are caused to squeeze through the apertures 32 of the casing 30 into the gas relief valve 20. Once they enter the gas relief valve 20, the gases remain undischarged in the gap portion, including the clearance, formed between the casing 30 and the valve member 40. As they continue entering the gas relief valve 20, they also continue being filled in the gap portion and pressing the valve member 40 upward opening the contact surfaces between the casing 30 and the valve member 40 gradually to create a gas passage therebetween. Once the contact surfaces therebetween is made open or an open gas passage is created therebetween, the gases filled in the gap portion are discharged therefrom through the wide open portion or the open gas passage of the valve member 40. The gases then flow upward along the upper peripheral surface 40*b* of the valve member 40 and a majority thereof is discharged through the space or clearance formed between the casing 30 and the pressing member 50, that is, through the space or clearance formed between the inner peripheral edge portions of the concave section 30*a* of the casing 30 and the notched sides 50*a* of the pressing member 50, into a space or clearance formed between the upper surface 50*d* of the pressing member 50 and the inner side wall surface portion 10*a* of the container 10. The rest of the gases, i.e. a small amount of the gases, discharged from the contact surfaces between the casing 30 and the valve member 40 is discharged through the aperture 52 of the pressing member 50 into the space or clearance formed between the upper surface 50*d* of the pressing member 50 and the inner side wall surface of the container. The gases discharged into the such space or clearance are then withdrawn through the aperture 14 on the inner side portion of the container 10 into the outside.

It is preferred to choose an appropriate kind of flexible materials for either or both of the valve member 40 and the pressing member 50. This selection allows the pressing member 50 and the valve member 40 to be recovered automatically to their original airtight contact state, that is, to be brought again into close contact, even if the contact surfaces between the casing 30 and the valve member 40 have been separated in whole or in part from each other due to the gases discharged therethrough. Therefore, once the contact surfaces therebetween were opened and the gases were discharged through the gas-flow passage formed therebetween, the penetration of air from the outside into the gas relief valve 20 can be prevented because the contact surfaces therebetween are closed automatically immediately after the gases filled in the gas relief valve have been discharged outside therefrom.

Further, it is preferred to appropriately use the non drying liquid as described hereinabove on the surfaces of the valve member 40 and/or the casing 30 to be contacted with each other, in order to ensure a close contact of the valve member 40 with the casing 30.

By appropriately choosing the flexible material for the valve member 40 and/or the pressing member 50 and/or the non drying liquid, the inner gas pressure of the gases to be discharged from the container 10 can be adjusted. If a flexible material having a high degree of flexibility is used for either or both of the valve member 40 and the pressing member 50, on the one hand, the inner gas pressure of the gases within the container 10 can be set to be lower because the valve member 40 can be pushed upward and pressed downward with a low gas pressure and the pressing member 50 can be recovered to its original state with such a low gas pressure. If a flexible material having a low degree of flexibility is used for either or both of the valve member 40 and the pressing member 50, on the other hand, the inner gas pressure can be set to be higher because the valve member 40 is pushed upward and pressed downward with a higher gas pressure and the pressing member 50 can be recovered to its original state only with such a higher gas pressure. Further, likewise, if a non-drying liquid having a higher degree of viscosity is used for the contact surfaces between the casing 30 and the valve member 40, on the one hand, the inner gas pressure of the gases within the container can be set to be higher because the contact surfaces therebetween are likely to be separated from each other with a higher inner gas pressure thereof. If a non-drying liquid having a lower degree of viscosity is used for the contact surfaces between the casing 30 and the valve member 40, on the other hand, the inner gas pressure can be set to be lower because the contact surfaces therebetween are likely to be separated from each other with a lower gas pressure thereof.

Fourth Embodiment

Figure 20:
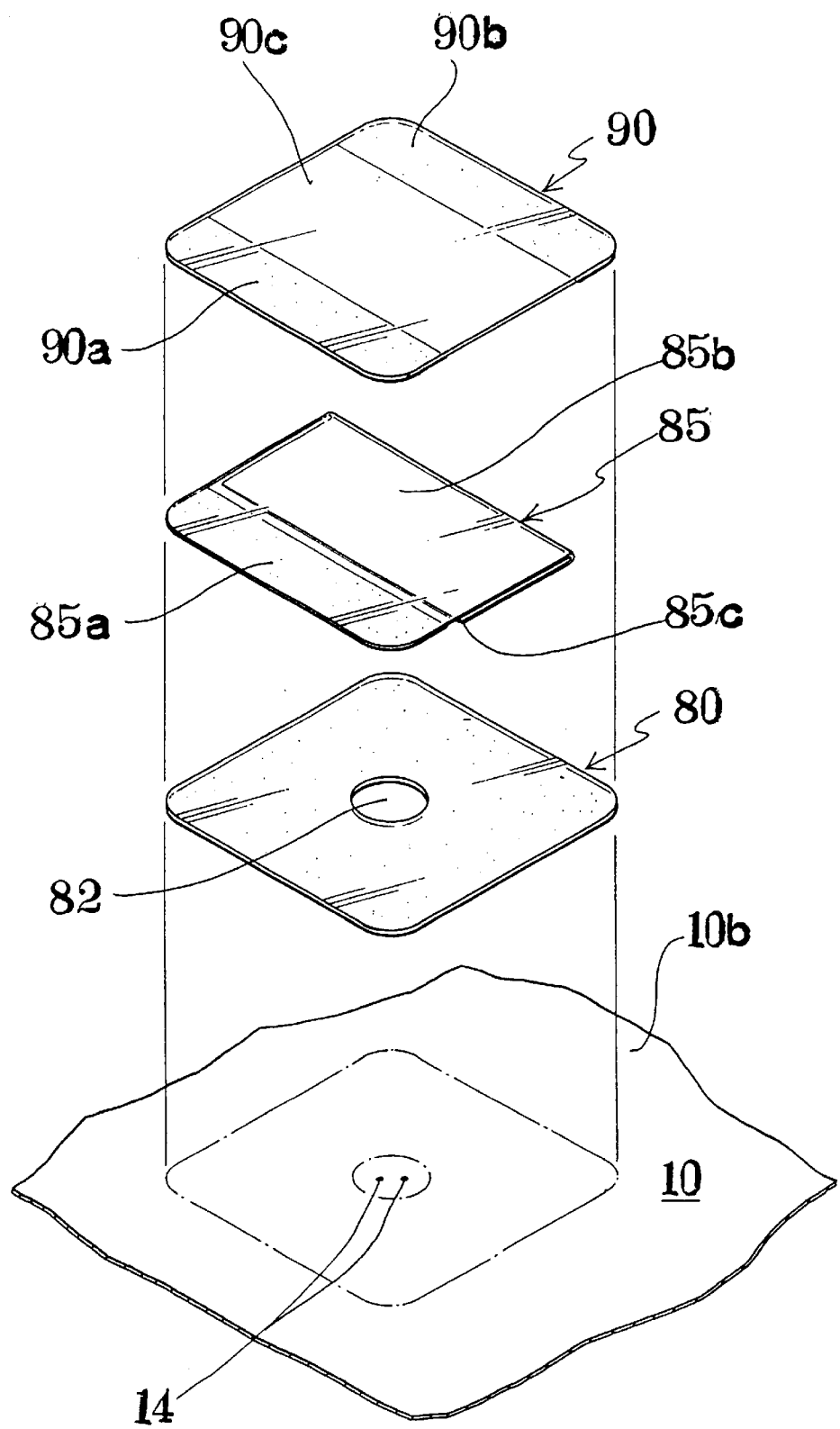
FIG. 20 is an exploded, perspective view showing elements of a fourth embodiment of a gas relief valve according to the present invention.
Figure 21:
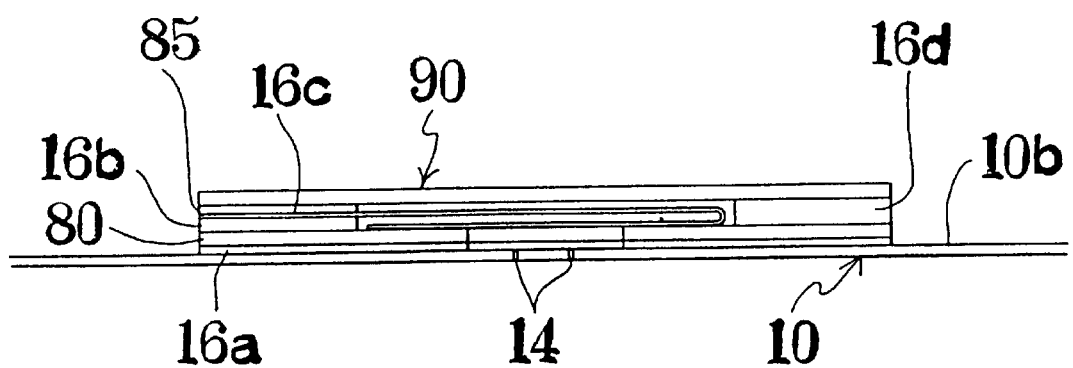
FIG. 21 is a sectional view showing the gas relief valve according to the fourth embodiment of the present invention.

The following is a specific description of the gas relief valve according to a fourth embodiment of the present invention with reference to FIGS. 20 and 21. FIG. 20 is an exploded, perspective view showing elements of the gas relief valve according to the fourth embodiment of the present invention and FIG. 21 is a sectional view showing the gas relief valve according to the fourth embodiment of the present invention. It is to be noted herein that the common elements are provided with the identical reference numerals and a duplicate description on the such common elements will be omitted from the following description for brevity of explanation.

The gas relief valve 20 for a container with contents generating gases according to the fourth embodiment of the present invention basically comprises a base member 80, a middle sheet member 85, and a lid member 90. Each of these elements is substantially equal in function to each of the elements constituting the gas relief valves according to the first, second and third embodiments of the present invention. More specifically, the base member 80 has the action as a support means like the casing 30 of the gas relief valves in the previous embodiments of the present invention; the middle sheet member 85 has the action as an opening and closing means like the valve member 40 of the gas relief valves therein; and the lid member 90 acts as a pressing means like the pressing member 50 in the gas relief valves therein.

For the gas relief valve 20 according to the fourth embodiment of the present invention, the base member 80 is provided at its central portion with an aperture 82 and its bottom surface may be adhesive-attached or welded to an outer upper side surface 10b of the container 10 where an aperture 14 is formed having a size large enough to allow the gases filled in the container 10 to be discharged therethrough. The number of the apertures is not restricted and it may be one or plural. It is needless to say that the gas relief valve is to be mounted on the container 10 in such a manner that the gases filled in the container 10 can be discharged through the opening 14 and introduced through the opening 82 into the gas relief valve. On an upper surface of the base member 80 is mounted the middle sheet member 85 which may be made of a flexible material of a synthetic resin and which may be in a square shape, as shown in the accompanying drawings. The shape of the middle sheet member 85 is not restricted to a particular one and it may be optional such as circular. A one side end portion 85a of the middle sheet member 85 is attached with adhesive or welded to a corresponding one upper side end portion of the base member 80 so as to fail to block the opening 82 of the base member 80. The rest portion 85b of the middle sheet member 85 may be folded, for example, in two sections, that is, an upper section and a lower section. When the middle sheet member 85 is mounted on the base member 80, the free side edge 85c of the lower section of the middle sheet member 85 may be located under the upper section thereof and above the base member 80 so as to cover the opening 82.

On and to an upper surface of the attached section 85a of the middle sheet member 85 is attached or welded a side portion 90a of the lid member 90 corresponding thereto. On the other hand, a side portion 90b thereof opposite to the attached portion 90a may also be attached or welded to an upper section of the base member 80 corresponding thereto. The attachment of the both side portions 90a and 90b provides a portion 90c interposed therebetween to be unattached to both of the base member 80 and the middle sheet member 85. Underneath the unattached portion 90c is disposed the folded section 85b of the middle sheet member 85 so as to provide a clearance therefor when the unfolded section 85b is caused to expand upward by the gases discharged from the container 10. In a usual case, the unattached portion 90c can act as pressing the folded section 85b of the middle sheet member 85 downward so as to prevent the air from penetrating from the outside into a gap between the unattached portion 90c and the folded section 85b. The pressing member 90 is made of a flexible material so as to expand upward when the gases discharged from the container 10 are introduced into the folded and unattached portion of the side section 85b of the middle sheet member 85 and the folded section 85b is caused to expand upward and so as to be automatically recovered to its original shape once the gases have been discharged from the gas relief valve 20 and the folded section 85b has been shrunk to its original position.

With this arrangement, when the inner gas pressure of the gases filled in the container is elevated to the predetermined level or higher, the gases filled in the closed container 10 are allowed to be discharged through the opening 14 from the container and introduced into the gas relief valve 20 through the opening 82 of the base member 80. Then, a portion of the gases introduced into the gas relief valve is then allowed to flow from the free edge 85c of the folded section 85b of the middle sheet member 85 into a gap formed by the folded sheet member 85. As the gases generated from the contents in the container and filled therein continue being introduced into the gas relief valve, the amount of the gases within the gap also continues increasing gradually, thereby eventually causing the entire or partial contact surfaces of the folded section 85b to separate from each other or an air opening to be formed therebetween and allowing the gases to be discharged from the gas relief valve. On the other hand, the rest portion of the gases introduced into the gas relief valve is allowed to flow under the downward folded section 85b of the middle sheet member 85 toward the folded edge of the folded section 85b and in a direction parallel to the inner edge of the attached side portion 90b of the lid member 90 or in a direction parallel to the attached section 85a of the middle sheet member 85. Then, the gases are discharged therefrom into the outside. Even when the opening is formed in the gas relief valve by the gases, the opening can be closed automatically so as to fail to prevent the air from being introduced from the outside into the gas relief valve because the middle sheet member 85 is made of a flexible material having a predetermined degree of elasticity and it can be automatically recovered to its original shape after it is deformed by the gases discharged from the container 10.

In FIG. 21, reference numeral 16a denotes a layer of adhesive used for attachment of the base member 80 to the outer side surface 10b of the container 10; reference numeral 16b a layer of adhesive used for attachment of the upper surface of the base member 80 to the surface 85a of the middle sheet member 85; reference numeral 16c a layer of adhesive used for attachment of the attached surface 85a of the middle sheet member 85 to the side portion 90a of the lid member 90; and reference numeral 16d a layer of adhesive used for attachment of the other side portion 90b of the lid member 90 to the corresponding side portion of the base member 80.

Other Embodiments

It is noted herein, needless to say, that the present invention is not construed as being restricted in any respect to the structures and the action of the embodiments as described hereinabove and that it is understood as encompassing any modifications and variations thereof within the scope and the spirit of the present invention.

In the gas relief valve according to the first embodiment of the present invention, a concave portion may be provided at an upper central portion of the valve member 40 without forming the projection 40c, like the valve member 40 for the gas relief valve 20 according to the second embodiment thereof. In this case, a projection may be provided so as to correspond to the concave portion at the central bottom portion of the pressing member 50 to be mounted on the top portion of the valve member 40.

Further, the gas relief valve according to the first embodiment of the present invention may be configured in such a way that the concave section 30a of the casing 30 is in a circular shape so as to allow its inner peripheral edge portions to be engaged with the outer peripheral, arc-shaped edge segments 50b on the long-diameter side of the pressing member 50. At both upper edge portions of the inner peripheral side edge of the concave section 30a and at the inner edge portions of the flange section 30b of the casing 30 may be provided each a groove portion that is disposed so as to be engaged with an outwardly extending projection disposed on the outer peripheral side edge of the pressing member 50.

In addition, in the gas relief valve 20 according to the first embodiment of the present invention where one aperture 32 is provided at the central portion of the concave 30a of the casing 30, as a matter of course, the number of apertures 32 is not restricted to one and it may be plural. Further, the size of the aperture 32 may be determined in an optional manner on the basis of the kind of contents to be placed in the container or sizes or particle sizes of a powdery material or a granular material.

Furthermore, in the gas relief valve 20 according to the second and third embodiments of the present invention, the valve member 40 and the pressing member 50 may be formed in such a manner as in the gas relief valve 20 according to the first embodiment. More specifically, a projection 40c may be provided at an upper central portion of the valve member 40 and a concave portion of the pressing member 50 at its central bottom portion so as to be engaged with each other, as in the same manner as in the gas relief valve 20 according to the first embodiment. This can ensure a stable arrangement of the valve member 40 with the casing 30.

In the gas relief valve 20 according to the fourth embodiment of the present invention, the middle sheet member 85 is folded in two; however, it is not required to fold the free end side portion of the middle sheet member 85 in two and the sheet member 85 can be used without folding. In this case, it is preferred that the free end of the middle sheet member 85 is set to be so small in size as to be disposed freely underneath the unattached portion 90c of the lid member 90 and between the portion 90c and the upper surface of the base member 80.

Further, in the gas relief valve 20 according to the fourth embodiment of the present invention, the side portion 90b of the lid member 90 may be disposed in a free fashion without attachment to the upper side portion of the base member 80 so that the free end can be raised upward to allow the gases to be discharged through an opening to be formed between the free side portion and the upper side end portion of the base member 80. In this case, it is preferred to use a flexible material having a high degree of elasticity for the lid member 90. By constituting the lid member 90 with such a flexible material, the opening on the free end side, once formed between the lid member 90 and the base member 80, can be automatically closed and the free end side of the lid member 90 can be recovered to its original closed state, immediately after the gases filled in the container 10 have been discharged from the gas relief valve 20. This arrangement can suppress the air from penetrating through the gas relief valve 20 into the container 10 even when the opening is formed between the lid member 90 and the base member 80 and the air has been discharged through the opening.

EFFECTS OF THE INVENTION

The gas relief valve according to the present invention is configured such that, when the gases generated from contents packed in a container and filled in the closed container reaches a predetermined inner gas pressure or higher, they can be automatically discharged outside the container through the opening formed in the side portion of the container or via the gas relief valve disposed over the opening. Accordingly, the container with the contents packed therein is not expanded and can be prevented from breakage. Further, once the gases are discharged from the container and the gas relief valve mounted thereon, air cannot enter the container through the opening from which the gases have been discharged because the opening is arranged so as to be closed automatically once the gases have been discharged from the gas relief valve.

What is claimed is:

1. A gas relief valve for a container, comprising:
    a support means having an aperture through which to discharge gases filled within said container on which said gas relief valve is mounted;
    an opening or closing means which is disposed so as to close said aperture of said support means in a normal state and which is caused to open by gases discharged from said aperture when a pressure of the gases filled in said container reaches a predetermined inner gas pressure; and a pressing means disposed outside said opening or closing member so as to cause said opening or closing means to close the aperture of said support means so as for air outside the gas relief valve to fail to enter therein after the gases filled in the gas relief valve are discharged therefrom, said opening or closing means being formed so as to provide a space on a bottom surface thereof as said opening or closing means is mounted on an outer side of said support means, said space being so disposed as to allow the gases filled in said container and passed through said aperture of said support means to be stored for discharging until the pressure of the gases reaches the predetermined inner gas pressure.

2. A gas relief valve as claimed in claim 1, wherein said support means and said opening or closing means are disposed in such a way that:

when a pressure of the gases discharged from the container into said space of said gas relief valve and filled in said space thereof becomes as high as the predetermined inner gas pressure or higher, a portion of said opening or closing means in contact with said support means is caused to open by the gases to be discharged therefrom and the gases are discharged through an opening formed between said opening or closing means and said support means; and when the gases have been discharged from said gas relief valve and the inner gas pressure within said container is reduced below said predetermined inner gas pressure, the open portion of said opening or closing means is closed again automatically in order to fail to cause air to penetrate into said gas relief valve and said container.

3. A gas relief valve as claimed in claim 1 or 2, wherein said opening or closing means is made of a flexible material.

4. A gas relief valve as claimed in claim 1 or 2, wherein said pressing means is made of a flexible material.

5. A gas relief valve as claimed in claim 1 or 2, wherein a number of the aperture is one or plural.

6. A gas relief valve as claimed in claim 1 or 2, wherein a contact portion between said support means and said opening or closing means is coated with a non-drying liquid.

7. A gas relief valve as claimed in claim 1 or 2, wherein:

said opening or closing means comprises a valve member having a bottom side disposed so as to form said space as said valve member is mounted on said support means, said valve member being caused to open to discharge the gases from said apertures of said valve member as the pressure of the gases reaches the predetermined inner gas pressure.

8. A gas relief valve as claimed in claim 7, wherein:

said support means is provided with plural apertures through which the gases filled in said container pass; and said valve member is provided with plural apertures and disposed on said support means so as to align with said plural apertures of said support means, said apertures of said valve member being so disposed as to allow the gases filled in said container to be stored for discharging until the pressure of the gases reaches the predetermined inner gas pressure, said valve member being caused to open to discharge the gases from said apertures of said valve member as the pressure of the gases in said apertures reaches the predetermined inner gas pressure.

9. A gas relief valve as claimed in claim 1 or 2, wherein each of said opening or closing member and said pressing member is made of a flexible material.

10. A container having a gas relief valve attached to an inner side wall surface thereof, said gas relief valve comprising:

a support means having an aperture through which to discharge gases filled within said container on which said gas relief valve is mounted;

an opening or closing means which is disposed so as to close said aperture of said support means in a normal state and which is caused to open by gases discharged from said aperture when a pressure of the gases filled in said container reaches a predetermined inner gas pressure; and a pressing means disposed outside said opening or closing means so as to cause said opening or closing means to close the aperture of said support means so as for air outside the gas relief valve to fail to enter therein after the gases filled in the gas relief valve are discharged therefrom, said opening or closing means being formed so as to provide a space on a bottom surface thereof as said opening or closing means is mounted on an outer side of said support means, said space being so disposed as to allow the gases filled in said container and passed through said aperture of said support means to be stored for discharging until the pressure of the gases reaches the predetermined inner gas pressure.

11. A container as claimed in claim 7, wherein:

said opening or closing means comprises a valve member having a bottom side disposed so as to form said space as said valve member is mounted on said support means, said valve member being caused to open to discharge the gases from said apertures of said valve member as the pressure of the gases reaches the predetermined inner gas pressure.

12. A container as claimed in claim 11, wherein:

said support means is provided with plural apertures through which the gases filled in said container pass; and said valve member is provided with plural apertures and disposed on said support means so as to align with said plural apertures of said support means, said apertures of said valve member being so disposed as to allow the gases filled in said container to be stored for discharging until the pressure of the gases reaches the predetermined inner gas pressure; and said valve member being caused to open to discharge the gases from said apertures of said valve member as the pressure of the gases in said apertures reaches the predetermined inner gas pressure.

13. A gas relief valve for a container, comprising:

a support member mounted to an outer side of said container having one aperture or plural apertures, said support member having one aperture or plural apertures through which to allow gases filled within said container to pass;

an opening or closing member which is disposed so as to close said aperture or plural apertures of said support means in a normal state and which is caused to open by the gases discharged from said aperture or apertures when the gases filled in said container reaches a predetermined inner gas pressure; and a pressing member disposed above said opening or closing member so as to cover said opening or closing member to allow the gases discharged from said opening or closing member to enter into said pressing member and so as to press said opening or closing member so as for air outside the gas relief valve to fail to enter therein in a normal state, wherein:

said opening or closing member is divided into first and second sections, said first section being attached to an outer side of said support member so as not to close the aperture or plural apertures of said support member, and said second section being disposed on the aperture or plural apertures of said support member so as to allow the gases passed through the aperture or plural apertures of said support member to pass under the lower side of said second section thereof when an inner pressure of the gases within said container reaches a predetermined inner gas pressure; and said pressing member is divided into at least two sections including third and fourth sections, said third section being attached on an outer side of said first section of said opening or closing member, and said fourth section being disposed on an outer side of said second section thereof so as to allow the gases passed through said second section thereof to pass under a bottom surface of said fourth section of said pressing member, and said fourth section thereof being disposed so as for no air outside said valve to pass through and under the bottom surface of said fourth section and enter in the container.

14. A gas relief valve as claimed in claim 13, wherein:

said opening or closing member is disposed such that said second section thereof is folded into two and an open side portion is folded inside to form a space at a folded portion so as to allow the gases discharged from said aperture or plural apertures of said support member to pass through the space formed by and inside the folded portion of said second section thereof; and said pressing member is disposed such that said fourth section thereof allows the gases passed through the space of said second section of said opening or closing member to pass through and under the bottom surface of said fourth section thereof.

15. A gas relief valve as claimed in claim 13, wherein:

said pressing member is divided into three sections including third, fourth and fifth sections, said third section being attached to the outer side of said first section of said opening or closing member, said third section being disposed so as to allow the gases discharged from the space of said opening or closing member to pass under the bottom surface of said pressing member, and said fifth section being attached to an outer side portion of said second section of said opening or closing member.

16. A container having a gas relief valve attached to an outer side wall surface thereof, said gas relief valve comprising:

a support member mounted to an outer side of said container having one aperture or plural apertures, said support member having one aperture or plural apertures through which to allow gases filled within said container to pass;

an opening or closing member which is disposed so as to close said aperture or plural apertures of said support means in a normal state and which is caused to open by the gases discharged from said aperture or apertures when the gases filled in said container reaches a predetermined inner gas pressure; and a pressing member disposed above said opening or closing member so as to cover said opening or closing member to allow the gases discharged from said opening or closing member to enter into said pressing member and so as to press said opening or closing member so as for air outside the gas relief valve to fail to enter therein in a normal state; wherein:

said opening or closing member is divided into first and second sections, said first section being attached to an outer side of said support member so as not to close the aperture or plural apertures of said support member, and said second section being disposed on the aperture or plural apertures of said support member so as to allow the gases passed through the aperture or plural apertures of said support member to pass under the lower side of said second section thereof when an inner pressure of the gases within said container reaches a predetermined inner gas pressure; and said pressing member is divided into at least two sections including third and fourth sections, said third section being attached on an outer side of said first section of said opening or closing member, and said fourth section being disposed on an outer side of said second section thereof so as to allow the gases passed through said second section thereof to pass under a bottom surface of said fourth section of said pressing member, and said fourth section thereof being disposed so as for no air outside said valve to pass through and under the bottom surface of said fourth section and enter in the container.

17. A container as claimed in claim 16, wherein:

said opening or closing member is disposed such that said second section thereof is folded into two and an open side portion is folded inside to form a space at a folded portion so as to allow the gases discharged from said aperture or plural apertures of said support member to pass through the space formed by and inside the folded portion of said second section thereof; and said pressing member is disposed such that said fourth section thereof allows the gases passed through the space of said second section of said opening or closing member to pass through and under the bottom surface of said fourth section thereof.

18. A container as claimed in claim 16 or 17, wherein said pressing member is divided into three sections including third, fourth and fifth sections, said third section being attached to the outer side of said first section of said opening or closing member, said third section being disposed so as to allow the gases discharged from the space of said opening or closing member to pass under the bottom surface of said pressing member, and said fifth section being attached to an outer side portion of said second section of said opening or closing member.

* * * * *